US012568455B2

(12) United States Patent　　(10) Patent No.:　US 12,568,455 B2

Takeda et al.　　　　　　　　　　　(45) Date of Patent:　　　Mar. 3, 2026

---

(54) TERMINAL AND BASE STATION APPARATUS

(71) Applicant: NTT DOCOMO, INC., Tokyo (JP)

(72) Inventors: Daiki Takeda, Tokyo (JP); Hiroki Harada, Tokyo (JP); Takuma Takada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 365 days.

(21) Appl. No.: 17/754,329

(22) PCT Filed: Oct. 3, 2019

(86) PCT No.: PCT/JP2019/039211

§ 371 (c)(1),
(2) Date: Mar. 30, 2022

(87) PCT Pub. No.: WO2021/064967

PCT Pub. Date: Apr. 8, 2021

(65) Prior Publication Data

US 2022/0346047 A1　　　Oct. 27, 2022

(51) Int. Cl.
　　*H04W 56/00*　　　　(2009.01)
　　*H04W 24/10*　　　　(2009.01)
(52) U.S. Cl.
　　CPC ....... *H04W 56/0035* (2013.01); *H04W 24/10* (2013.01); *H04W 56/001* (2013.01)
(58) Field of Classification Search
　　CPC ............. H04W 56/0035; H04W 24/10; H04W 56/001; H04W 56/0015; H04L 5/001; H04L 5/0048; H04L 5/0094
　　See application file for complete search history.

(56) References Cited

U.S. PATENT DOCUMENTS

2014/0301353 A1　　10/2014　Frenne et al.
2021/0306888 A1*　　9/2021　Kim ...................... H04W 24/08
2022/0329381 A1*　10/2022　Fang ................. H04W 56/0015

OTHER PUBLICATIONS

Office Action in the counterpart Japanese Application No. 2021-550906, mailed Jun. 27, 2023 (5 pages).
ZTE: "Use of RSS for measurement improvement", 3GPP TSG RAN WG1 Meeting #98, R1-1908263; Prague, CZ, Aug. 26-30, 2019 (4 pages).
3GPP TS 36.213 V15.6.0; "3rd Generation Partnership Project; Technical Specification Group Radio Access Network; Evolved Universal Terrestrial Radio Access (E-UTRA); Physical layer procedures (Release 15)"; Jun. 2019 (551 pages).
3GPP TS 36.331 V15.6.0; "3rd Generation Partnership Project; Technical Specification Group Radio Access Network; Evolved Universal Terrestrial Radio Access (E-UTRA); Radio Resource Control (RRC); Protocol specification (Release 15)"; Jun. 2019 (960 pages).

(Continued)

*Primary Examiner* — Hashim S Bhatti
(74) *Attorney, Agent, or Firm* — Osha Bergman Watanabe & Burton LLP

(57)　　　　　　　ABSTRACT

A terminal including: a reception unit configured to receive, from a base station apparatus of a serving cell, information indicating a relation between a frequency position of a resynchronization signal of the serving cell and a frequency position of a resynchronization signal of a neighbor cell, wherein the reception unit receives the resynchronization signal of the neighbor cell at a frequency position based on the relation.

4 Claims, 17 Drawing Sheets

(56)         References Cited

OTHER PUBLICATIONS

International Search Report for corresponding International Application No. PCT/JP2019/039211, mailed Apr. 7, 2020 (4 pages).

Written Opinion for corresponding International Application No. PCT/JP2019/039211, mailed Apr. 7, 2020 (3 pages).

Sony; "Considerations on using RSS for measurements"; 3GPP TSG RAN WG1 Meeting #94-bis, R1-1810655; Chengdu, China; Oct. 8-12, 2018 (4 pages).

Sony; "Overhead reduction in neighbour cell RSS signalling"; 3GPP TSG RAN WG1 #96bis, R1-1904234; Xi'an, China; Apr. 8-12, 2019 (3 pages).

Nokia et al.; "Use of RSS for measurement improvements"; 3GPP TSG RAN WG1 Meeting #94bis, R1-1811072; Chengdu, China; Oct. 8-12, 2018 (3 pages).

LG Electronics; "Discussion on the use of RSS for measurement improvement"; 3GPP TSG RAN WG1 Meeting #96bis, R1-1904613; Xi'an, China; Apr. 8-12, 2019 (5 pages).

ZTE; "Remaining issues on downlink aspects to support TDD NB-IoT"; 3GPP TSG RAN WG1 Meeting #92bis, R1-1804182; Sanya, China; Apr. 16-20, 2018 (21 pages).

Samsung; "Discussion on Enhanced Synchronization Signals and Re-Synchronization Signals"; 3GPP TSG RAN WG1 Meeting #93, R1-1806682; Busan, Korea; May 21-25, 2018 (5 pages).

Office Action in the counterpart Japanese Application No. 2021-550906, mailed Sep. 26, 2023 (4 pages).

Office Action in Indian Application No. 202217021334, mailed Dec. 29, 2023 (5 pages).

Office Action issued in counterpart Chinese Patent Application No. 201980100923.5 mailed on Aug. 23, 2023 (16 pages).

* cited by examiner

RSS duration 40 ms

Subframe #1

RSS

11 OFDM symbol

Subframe #2

RSS

11 OFDM symbol

Subframe #N

RSS

11 OFDM symbol

LTE PDCCH region cannot be used for eMTC

```
RSS-Config-r15 ::= SEQUENCE {
duration-r15 ENUMERATED {sf8, sf16, sf32, sf40},
freqLocation-r15 INTEGER (0..98),
periodicity-r15 ENUMERATED {ms160, ms320, ms640, ms1280},
powerBoost-r15 ENUMERATED {dB0, dB3, dB4dot8, dB6},
timeOffset-r15 INTEGER (0..31)
}
```

NEIGHBOR CELL A        SERVING CELL        NEIGHBOR CELL B

UE
MONITOR
ENABLED
RSS                    RSS                 RSS

6RB f f

RSS OF
SERVING
CELL

RSS OF
NEIGHBOR
CELL (OFFSET)

t

FREQUENCY RANGE A

RSS OF SERVING CELL

RSS OF NEIGHBOR CELL

RSS OF NEIGHBOR CELL

RSS OF SERVING CELL

F2

F1

ΔF

TERMINAL AND BASE STATION APPARATUS

TECHNICAL FIELD

The present invention relates to a technique for measurement in a wireless communication system.

BACKGROUND ART

In enhancement of eMTC in Rel-15 of LTE, reduction of System acquisition time was studied. In the study, it was feared that it would take time for a user terminal to re-detect PSS/SSS when the user terminal performs resynchronization of time and frequency, and extension of PSS/SSS and signals for resynchronization were discussed. As a result, a signal for resynchronization called Resynchronization Signal (RSS, resynchronization signal) was supported in Rel-15.

Furthermore, enhancements of eMTC are being discussed in Rel-16, and as one of them, measurement using RSS is being studied

PRIOR ART DOCUMENTS

Non-Patent Documents

[Non-Patent Document 1 ] 3GPP TS 36. 213 V15. 6. 0 (2019 June)
[Non-Patent Document 2 ] 3GPP TS 36. 331 V15. 6. 0 (2019 June)

SUMMARY OF INVENTION

Problem to be Solved by the Invention

When it is assumed that a user terminal measures RSRP (received power) of an RSS transmitted by a neighbor cell, it is desirable to receive information on a time and frequency position of the RSS of the neighbor cell from a base station apparatus of the serving cell.

However, RSSs of one or more neighbor cells may not be accommodated within a frequency range where the user terminal can monitor the RSS. This is particularly true for user terminals with narrow bandwidth to be monitored at one time. In such a case, the user terminal needs to receive an RSS of each neighbor cell while switching the frequency range, which increases processing load. That is, there is a problem in that the user terminal cannot efficiently receive an RSS of a neighbor cell.

The present invention has been made in view of the foregoing, and an object is to provide a technique that enables a user terminal to efficiently receive a resynchronization signal of a neighbor cell.

Means for Solving Problems

According to the disclosed technique, there is provided a terminal including:

a reception unit configured to receive, from a base station apparatus of a serving cell, information indicating a relation between a frequency position of a resynchronization signal of the serving cell and a frequency position of a resynchronization signal of a neighbor cell, wherein the reception unit receives the resynchronization signal of the neighbor cell at a frequency position based on the relation.

Effects of the Invention

According to the disclosed technique, a technique is provided which allows a user terminal to efficiently receive a resynchronization signal of a neighbor cell.

MODE FOR CARRYING OUT THE INVENTION

Hereinafter, embodiments of the present invention will be described with reference to the drawings. The embodiments described below are examples, and the embodiments to which the present invention is applied are not limited to the following embodiments.

In operating a wireless communication system according to an embodiment of the present invention, existing techniques are used as appropriate. The existing technology is, for example, an existing LTE or NR. The present invention is applicable to any wireless communication system, not only LTE or NR.

In embodiments of the present invention, the duplex mode may be TDD (Time Division Duplex), FDD (Frequency Division Duplex), or any other mode (e.g., Flexible Duplex, etc.).

In Examples 1 to 3, an example of an RSS (resynchronization signal) is described, but other signals can be used to apply Examples 1 to 3 to the signal. The resynchronization signal may be replaced by another signal (e.g., a synchronization signal).

(System Configuration)

Figure 1:
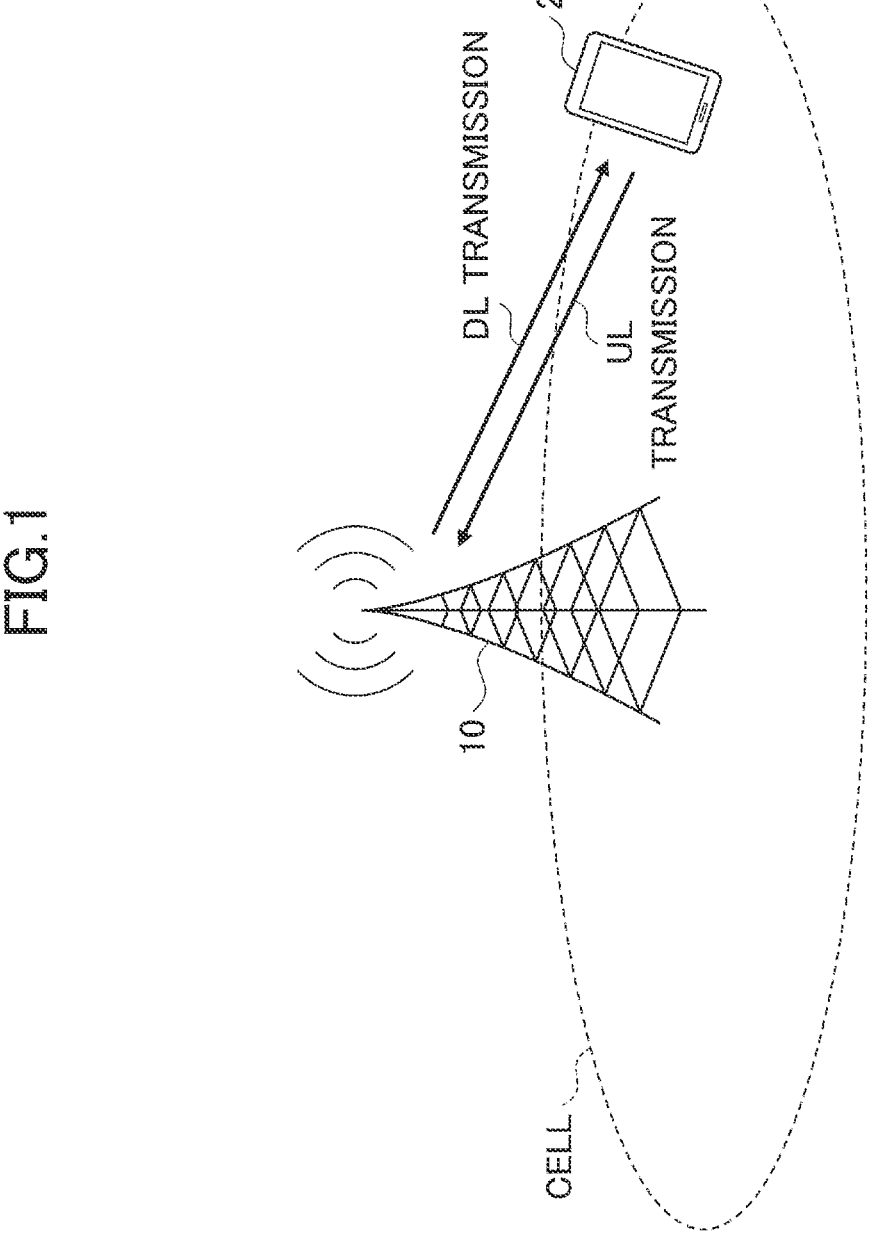
FIG. 1 is a diagram for explaining a wireless communication system according to an embodiment of the present invention.

FIG. 1 is a diagram illustrating a wireless communication system according to an embodiment of the present invention. The wireless communication system in an embodiment of the present invention includes a base station apparatus 10 and a user terminal 20, as shown in FIG. 1. In FIG. 1, one base station apparatus 10 and one user terminal 20 are shown, but this is an example and a plurality of base station apparatuses and a plurality of user terminals may be provided.

For example, the base station apparatus 10 may provide a serving cell (also referred to as the own cell) for the user terminal 20, and one or more neighbor cells may be formed by one or more other base station apparatuses adjacent to the serving cell. The user terminal 20 may be referred to as a "terminal."

The base station apparatus 10 is a communication device that provides one or more cells and performs wireless communication with the user terminal 20. The physical resources of the radio signal are defined in the time domain and the frequency domain, the time domain may be defined in subframes or slots or OFDM symbols, and the frequency domain may be defined in subbands, subcarriers or resource blocks.

As shown in FIG. 1, the base station apparatus 10 transmits control information or data in DL (Downlink) to the user terminal 20 and receives control information or data in UL (Uplink) from the user terminal 20. Both the base station apparatus 10 and the user terminal 20 are capable of beam forming to transmit and receive signals. Also, both the base station apparatus 10 and the user terminal 20 can apply communication by MIMO (Multiple Input Multiple Output) to DL or UL. The base station apparatus 10 and the user terminal 20 may both communicate via a CA (Carrier Aggregation) via a SCell (Secondary Cell) and a PC (Primary Cell).

The user terminal 20 is a communication device having a wireless communication function such as a smartphone, a cellular phone, a tablet, a wearable terminal, a communication module for M2M (Machine-to-Machine), or the like. As shown in FIG. 1, the user terminal 20 utilizes various communication services provided by the wireless communication system by receiving control information or data in DL from the base station apparatus 10 and transmitting control information or data in UL to the base station apparatus 10. The user terminal 20 according to the present embodiment is assumed to be a terminal having a reduced usable bandwidth corresponding to NB-IoT or eMTC, but is not limited to this assumption.

Figure 2:
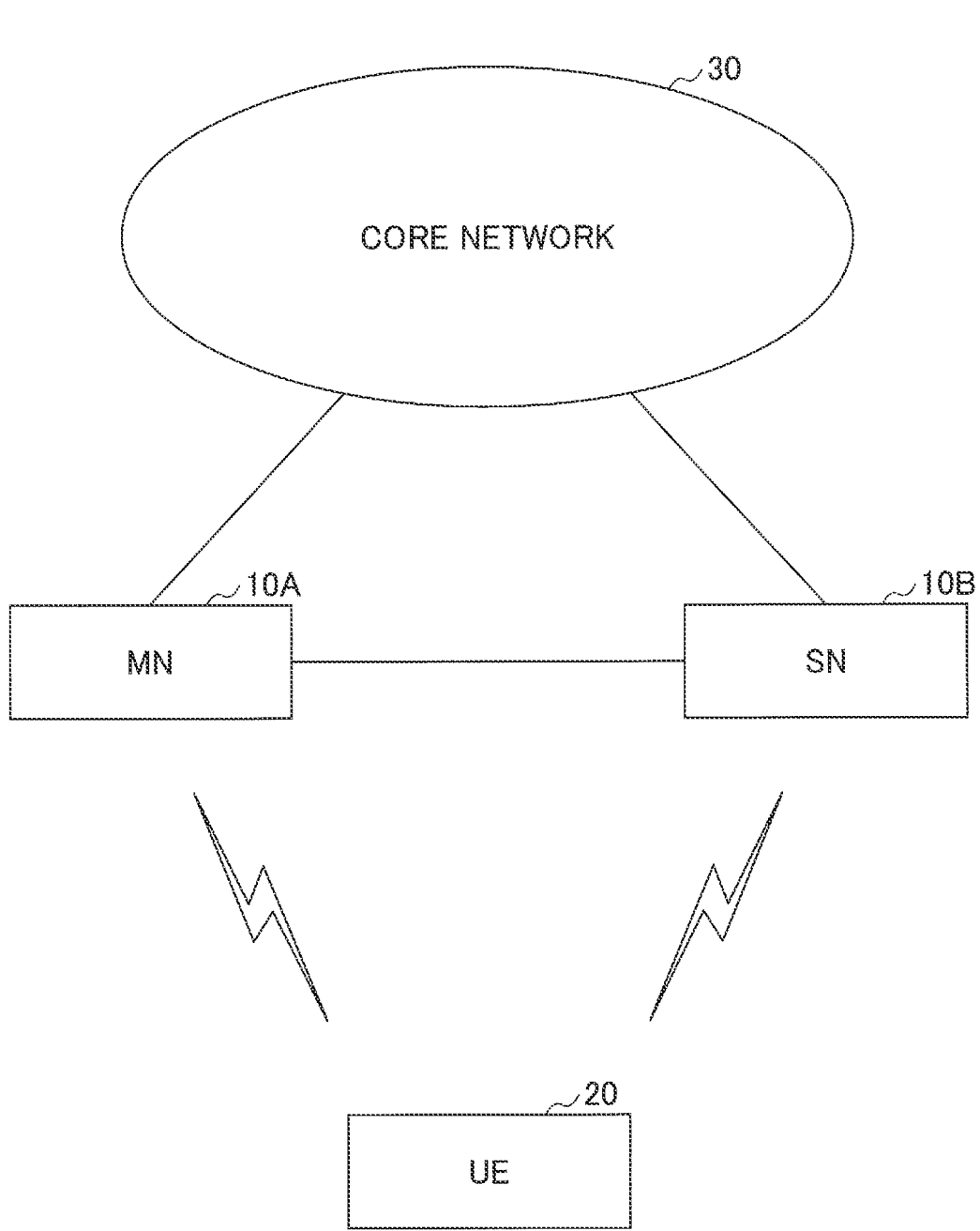
FIG. 2 is a diagram for explaining a wireless communication system according to an embodiment of the present invention.

FIG. 2 shows an example of a configuration of a wireless communication system when NR-DC (NR-Dual connectivity) is executed. As shown in FIG. 2, a base station apparatus 10A serving as an MN (Master Node) and a base station apparatus 10B serving as an SN (Secondary Node) are provided. The base station apparatus 10A and the base station apparatus 10B are each connected to a core network. The user terminal 20 communicates with both the base station apparatus 10A and the base station apparatus 10B.

The cell group provided by the base station apparatus 10A that is an MN is called the MCG (Master Cell Group), and the cell group provided by the base station apparatus 10B that is an SN is called the SCG (Secondary Cell Group). The operations described later in Examples 1 to 3 may be performed in any of the configurations of FIGS. 1 and 2.

(About RSS)

In this embodiment, an RSS is transmitted from each of the base station apparatus 10 of the serving cell and the base station apparatuses of the one or more neighboring cells.

The sequence of RSS is generated based on a Gold sequence. The RSS is mapped to 2 PRBs (two physical resource blocks) by QPSK modulation.

The frequency position of the RSS is configurable and is notified from the base station apparatus 10 to the user terminal 20 by system information (SIB). Specifically, the RSS can be placed in contiguous 2 PRBs in the LTE system band and the location of the Lowermost PRB is notified.

Figure 3:
FIG. 3 is a diagram for explaining an RSS.

The transmission period, the time offset, and the transmission time length of the RSS are also configurable, and the base station apparatus 10 transmits them to the user terminal 20 by system information (SIB). Specifically, the transmission period is selected from 160, 320, 640, and 1280 ms, and the granularity of the time offset is determined based on the period (1, 2 frames, or 4 frames). The transmission time length is selected from 8, 16, 32, and 40 ms. FIG. 3 shows an example of a configuration of an RSS with a time length of 40 ms.

As can be seen from FIG. 3, for RSS, the amount of time and frequency resources is large compared to PSS/SSS, and the user terminal 20 can realize short-term time and frequency synchronization with the base station apparatus 10. As described in Non-Patent Document 1, 4.1 Cell search, "For a BL/CE UE, if the UE is configured with higher layer parameter RSS-Config, the UE can use the resynchronization signal (as defined in [3]) to re-acquire time and frequency synchronization with the cell.", the user terminal 20 can perform resynchronization of time and frequency by RSS.

In this embodiment, the RSS is used not only for synchronization of time and frequency but also for measurement. When the user terminal 20 receives an RSS, for example, RSRP (received power) or RSRQ (received quality) is measured.

For example, in an RRC-Idle state, the user terminal 20 determines whether to perform cell reselection (cell transition) based on received power measured by an RSS of the serving cell and received power measured by each RSS of one or more neighbor cells.

For example, in an RRC-Connected state, the user terminal 20 reports received power measured by an RSS of the serving cell and received power measured by each RSS of one or more neighboring cells to the base station apparatus 10 so that the base station apparatus 10 can determine whether to cause the user terminal 20 to perform a handover. Thereafter, for example, an amount measured by an RSS is received power, but the amount measured by the RSS may be received quality.

In order for the user terminal 20 to measure received power of RSSs transmitted in each of the one or more neighbor cells, it is desirable that the user terminal 20 knows a location of a time and frequency resource of an RSS transmitted in each neighbor cell (for convenience, referred to as time and frequency position). Therefore, according to the present embodiment, the serving cell base station apparatus 10 may transmit a parameter representing the time and frequency position of each neighboring cell to the user terminal 20 by an RRC message (system information, etc.). Specifically, for example, the following parameters may be transmitted.

ce-rss-periodicity-config: RSS periodicity {160, 320, 640, 1280} ms ce-rss-duration-config: RSS duration {8, 16, 32, 40} subframes ce-rss-freqPos-config: RSS frequency location (lowest physical resource block number)

ce-rss-timeOffset-config: RSS time offset in number of radio frames ce-rss-powerBoost-config: RSS power offset relative to LTE CRS {0, 3, 4.8, 6} dB However, when the detailed information representing the time and frequency position of each neighbor cell is notified from the base station apparatus 10 to the user terminal 20, the time and frequency position of the RSS may be limited because signaling amount increases. For example, "RSS time offset and RSS frequency position" may be determined as a function of a cell ID.

(Basic Operation Example)

Figure 4:
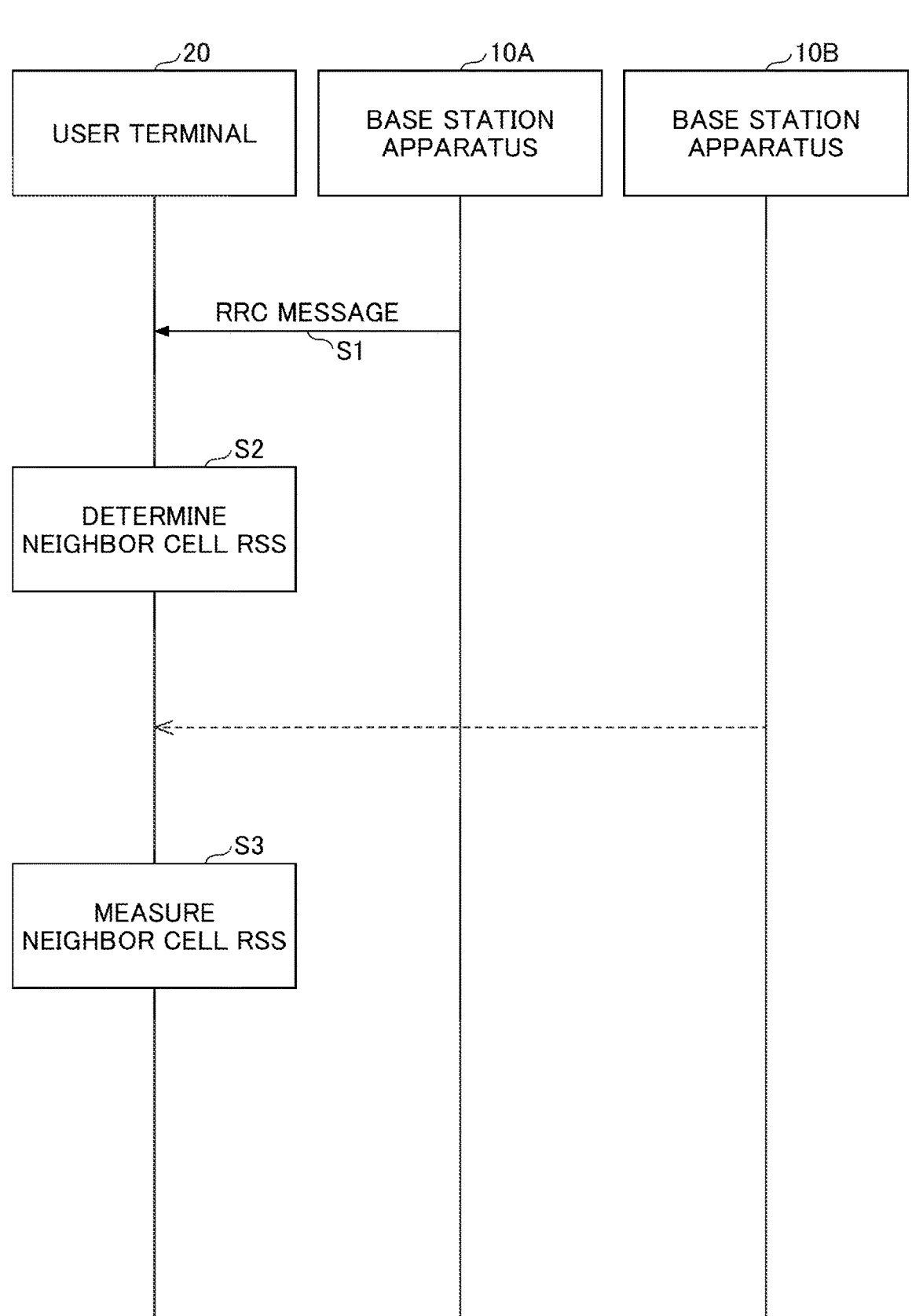
FIG. 4 is a diagram for explaining a basic operation example.

FIG. 4 is a diagram illustrating a basic operation example according to the present embodiment (including Examples 1 to 3). In FIG. 4, the base station apparatus 10A is a base station apparatus of the serving cell of the user terminal 20, and the base station apparatus 10B is a base station apparatus of a neighboring cell. Although a plurality of neighbor cells may be present, for convenience, FIG. 4 illustrates one base station apparatus of one neighbor cell.

In S1, the user terminal 20 receives an RRC message (system information or the like) including configuration information of a time and frequency position of an RSS of the serving cell from the base station apparatus 10. As detailed in Examples 1-3, the RRC message may include information regarding placement of an RSS of a neighbor cell in the time domain or frequency domain. Information on the placement of the RSS of the neighbor cells in the time domain or the frequency domain may be transmitted in an RRC message that is different from the RRC message that transmits the time and frequency position information of the RSS of the serving cell.

Figures 5, 6:
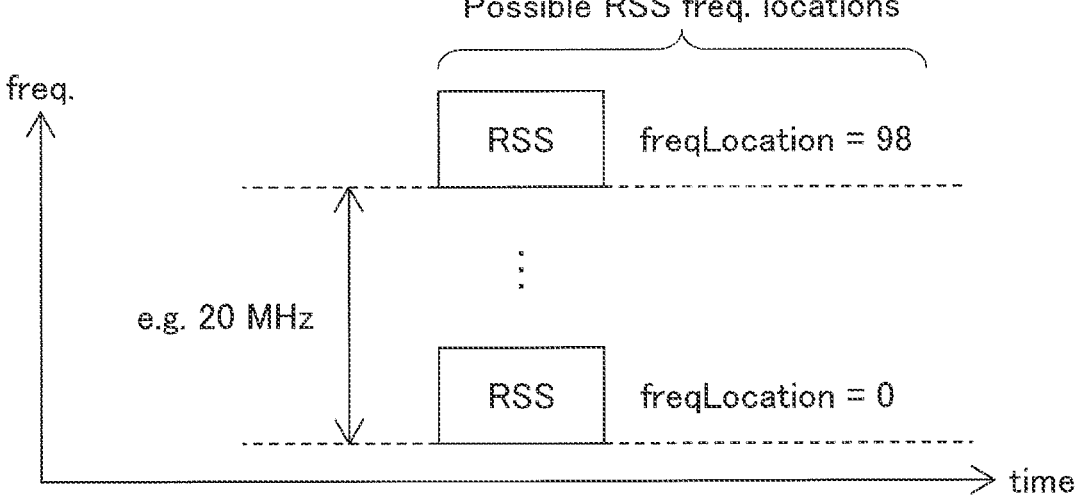
FIG. 5 is a diagram showing an example of RSS configuration information.
FIG. 6 is a diagram for explaining a frequency direction arrangement of an RSS.

FIG. 5 shows an example (extract from Non-Patent Document 2) of configuration information of the time and frequency position of the RSS of the serving cell. FIG. 6 illustrates positions where RSS can be placed in the frequency domain when the system bandwidth is 20 MHz, showing 99 possible placements from 0 to 98.

In S2 of FIG. 4, the user terminal 20 determines the time and frequency position (the time and frequency range) of the RSS of the neighboring cell, and at S3, receives the RSS of the neighboring cell and measures the received power of the RSS.

Since FIG. 4 is a diagram that focuses on the measurement of neighboring cells, measurement of the neighboring cells is described. However, the user terminal 20 may perform measurement using an RSS of a neighbor cell in addition to measurement using an RSS of the serving cell.

In FIG. 4, the user terminal 20 may be in the RRC-Idle state or in the RRC-Connected state at the time of measurement of the neighbor cells.

Hereinafter, a more detailed example of operation will be described as Examples 1 to 3. Example 1, Example 2, and Example 3 may be combined and executed.

EXAMPLE 1

As illustrated in FIG. 6, the location (frequency position) of an RSS frequency resource can be arbitrarily configured in the LTE system bandwidth and Cell-specific configuration is possible.

However, if such an RSS frequency position is assumed, it is assumed that an RSS of a neighbor cell will not fit within a frequency range that can be monitored by the user terminal 20 when measurement of a neighbor cell using an RSS is assumed.

In such a case, the user terminal 20 may not be able to simultaneously monitor an RSS of the serving cell and an RSS of neighbor cell or RSSs of neighbor cells, for example, may be forced to measure over multiple RSS cycles (periods), which may increase load of measurement.

Figure 7:
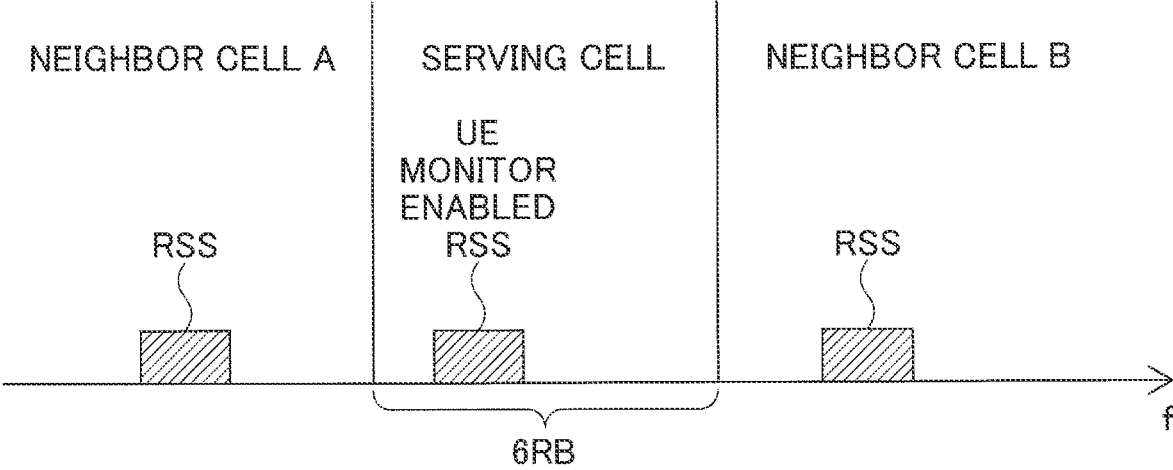
FIG. 7 is a diagram for explaining a problem according to Example 1.

FIG. 7 illustrates an example in which an RSS of a neighbor cell is not accommodated in a frequency range that the user terminal 20 can monitor. FIG. 7 shows a case where the user terminal 20 can monitor a bandwidth of 6 RBs. As shown in FIG. 7, both RSSs of the neighbor cell A and the neighbor cell B are outside the range of frequency that the user terminal 20 can monitor. In this case, for example, the user terminal 20 may be unable to monitor the RSS of the neighbor cell A and the RSS of the neighbor cell B, or it may be necessary to move the range (6 RB) that can be monitored to monitor the RSS of the neighbor cell A and the RSS of the neighbor cell B. Such an operation may increase the load.

Accordingly, in Example 1, the base station apparatus 20 notifies the user terminal 20 of information indicating whether or not a frequency position of an RSS of a neighbor cell is close to a frequency position of an RSS of the serving cell (the one designated by RSS-config), explicitly or implicitly. The user terminal 20 can monitor the RSS of the neighbor cell with less load by knowing that the frequency position of the RSS of the neighbor cell is close to the frequency position of the RSS of the serving cells based on the notified information. In terms of the base station apparatus side, in Example 1, it is assumed that RSSs are arranged in a specific frequency range between neighbor cells.

Specifically, Examples 1-1 to 1-3 are provided below. The following shows an example where there is only one neighbor cell, but the number of neighbor cells may be two or more.

Example 1-1

In Example 1-1, the base station apparatus 10 notifies the user terminal 20 of information indicating whether the frequency position of the RSS of the neighbor cell is common to (the same as) the frequency position of the RSS of the serving cell or information indicating whether the frequency position of the RSS of the neighbor cell and the frequency position of the RSS of the serving cell are within a specific frequency range.

In S1 of FIG. 4, the above-described notification may be made along with configuration information transmission of the RSS of the serving cell, or it may be made at a timing other than S1 of FIG. 4. Such notification may also be made by an RRC message, MAC CE, or DCI. The notification may include identification information (e.g., cell ID of the neighbor cell) that identifies the neighbor cell. This identification information allows the user terminal 20 to know which RSS of neighbor cells to receive. The cell ID can be obtained from a sequence of RSS.

Figure 8:
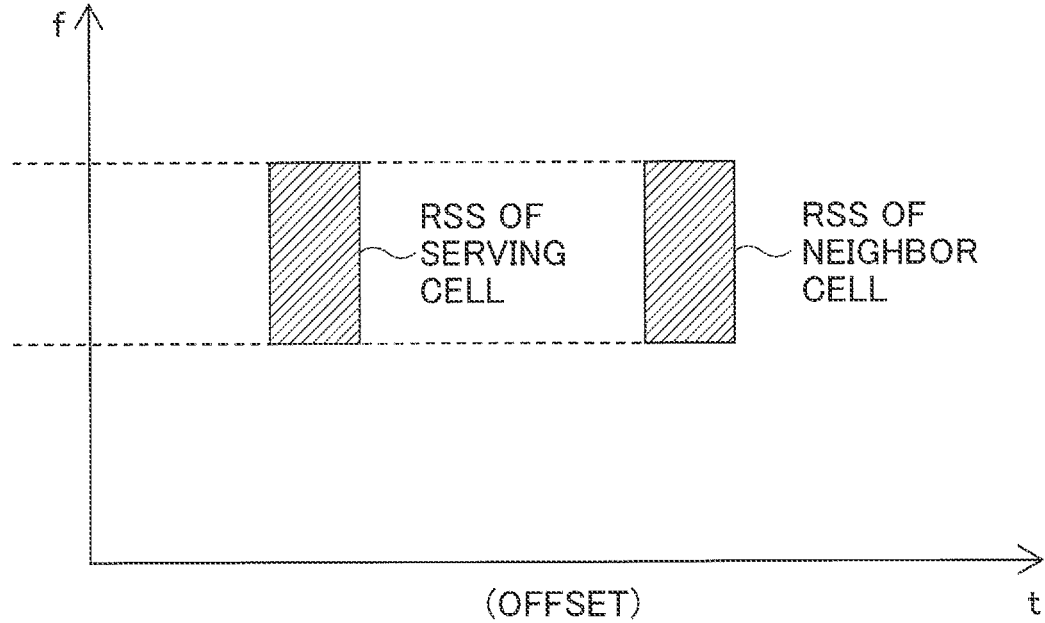
FIG. 8 is a diagram showing an example of arrangement of RSSs according to Example 1-1.

An example of time and frequency arrangement of RSSs is shown in FIG. 8 in which the base station apparatus 10 transmits information to the user terminal 20 indicating that the frequency position of the RSS of the neighbor cell is common to the frequency position of the RSS of the serving cell. The horizontal axis represents time, indicating offset. That is, RSS is transmitted periodically at the time position shown in FIG. 8.

Since the user terminal 20 knows the time and frequency position (that can be monitored by the user terminal 20) of the RSS of the serving cell by the RSS-Config, the user terminal 20 can receive an RSS of the neighbor cell and perform measurement at the same frequency position.

Regarding a time position of an RSS of a neighbor cell, for example, the time position is notified from the base station apparatus 10 to the user terminal 20. The user terminal 20 may also, for example, blindly detect an RSS of the neighbor cell assuming that the time position of the RSS of the neighbor cell is close to or the same as the time position of the RSS of the serving cell.

Figure 9:
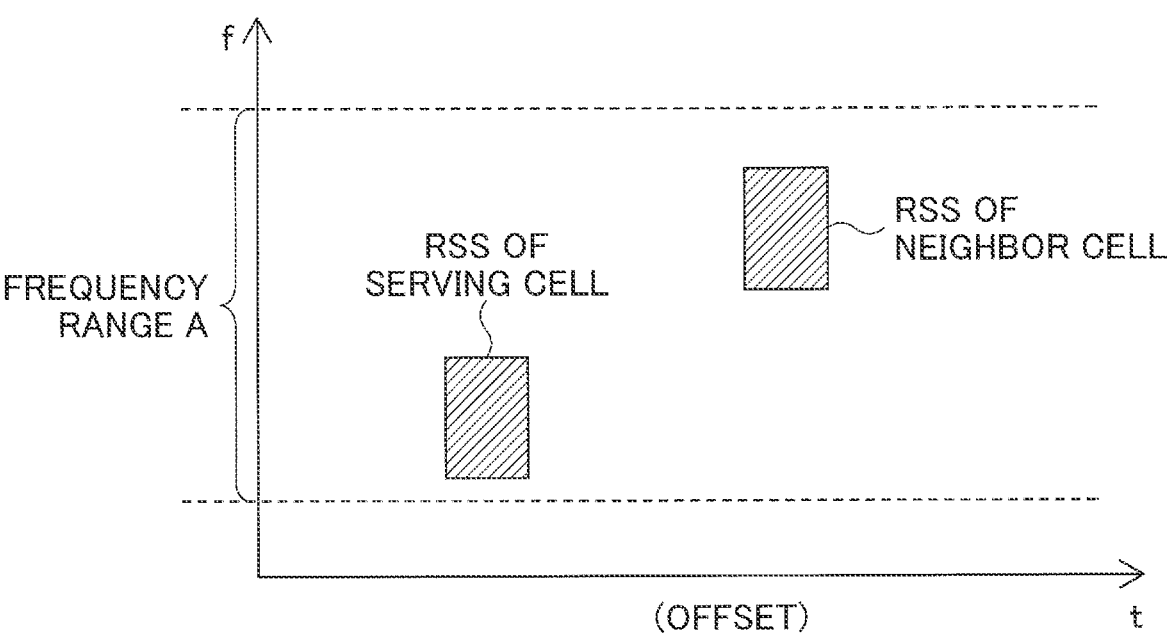
FIG. 9 is a diagram showing an example of arrangement of RSSs according to Example 1-1.

An example of a time and frequency arrangement of an RSS in the case where the base station apparatus 10 transmits information to the user terminal 20 indicating that the frequency position of the RSS of the neighboring cell and the frequency position of the RSS of the serving cell are within a specific frequency range is illustrated in FIG. 9. In the example of FIG. 9, it is shown that the frequency position of the RSS of the neighbor cell and the frequency position of the RSS of the serving cell are within the frequency range A. This frequency range A may be a band of a bandwidth that the user terminal 20 can monitor.

Since the user terminal 20 knows the time and frequency position (which can be monitored by the user terminal 20) of the RSS of the serving cell by the RSS-Config, the user terminal 20 can receive the RSS of the neighbor cell and perform measurement at the frequency position within the frequency range A in which the frequency position is present, for example, with blind detection.

With regard to a time resource position (time position) of an RSS of a neighbor cell, for example, the time position is notified from the base station apparatus 10 to the user terminal 20. The user terminal 20 may also, for example, blindly detect the RSS of the neighbor cell assuming that the time position of the RSS of the neighbor cell is close to or the same as the time position of the RSS of the serving cell.

Alternatively, operation may be changed depending on whether the serving cell and the neighbor cell are time synchronized or not without such notification. An operation example of the user terminal 20 in this case will be described with reference to a flowchart of FIG. 10. Assuming that a neighbor cell is detected by, for example, PSS/SSS of the neighbor cell.

In S101, the user terminal 20 determines whether or not the serving cell and the neighbor cell are time synchronized. Whether they are time synchronized may be determined, for example, by determining whether Multiplexing mode of both the serving cell and the neighbor cell is TDD. In this case, if Multiplexing mode of both the serving cell and the neighbor cell is TDD, it is determined that they are time-synchronized.

When the determination of S101 is Yes (determined to be time synchronized), in S102, the user terminal 20 determines that the frequency position of the RSS of the neighbor cell and the frequency position of the RSS of the serving cell are within a specific frequency range, receives the RSS of the neighbor cell, and performs measurement. In S102, the user terminal 20 may determine that the frequency position of the RSS of the neighbor cell is common to the frequency position of the RSS of the serving cell and performs measurement.

When the determination of S101 is No (it is determined that cells are not time synchronized), in S103, the user terminal 20 measures an RSS of the neighbor cell by using information of the time and frequency position of the neighbor cell received from the base station apparatus 10. The user terminal 20 determines, for example, that the serving cell and the neighbor cell are not time-synchronized when Multiplexing Mode of at least one of the serving cell and the neighbor cell is FDD.

Figure 10:
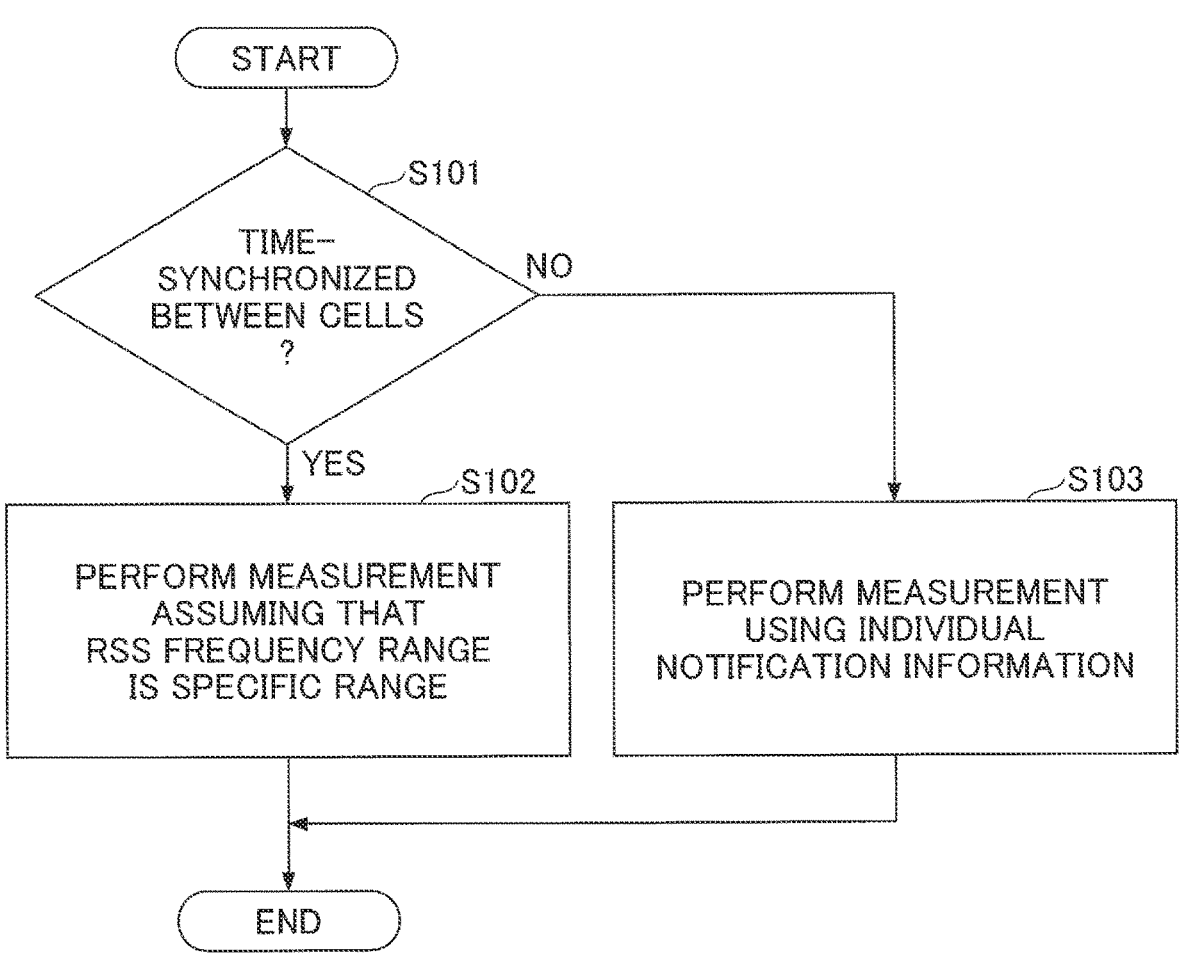
FIG. 10 is a diagram for explaining an operation example according to Example 1-1.

When the operation of FIG. 10 is executed, the base station apparatus 10 transmits detailed information of the time and frequency position for the neighbor cell that is not time synchronized with its own cell by an RRC message or the like, and does not transmit detailed information of the time and frequency position for the neighbor cell that is time synchronized with its own cell. However, it is not limited to this operation.

Examples 1-2

In Example 1-2, the base station apparatus 10 notifies the user terminal 20 of information regarding a time position of an RSS of a neighbor cell, and the user terminal 20 determines whether the frequency position of the RSS of the neighbor cells is common with the frequency position of the RSS of the serving cell, or determines whether the frequency position of the RSS of the neighbor cell and the frequency position of the RSS of the serving cell are within a specific frequency range. That is, in Example 1-2, the user terminal 20 is implicitly notified as to whether the frequency position of the RSS is common between the serving cell and the neighbor cell, or whether the frequency position of the RSS is within a specific frequency range for the serving cell and the neighbor cell.

The information about the time position of the RSS of the neighbor cell is, for example, information indicating whether the RSS of the serving cell and the RSS of the neighbor cell exist at the same time position. The "same time position" may be that both offset and period are the same between the RSS of the serving cell and the RSS of the neighbor cell, or that the offset is the same and the period is different.

Figure 11:
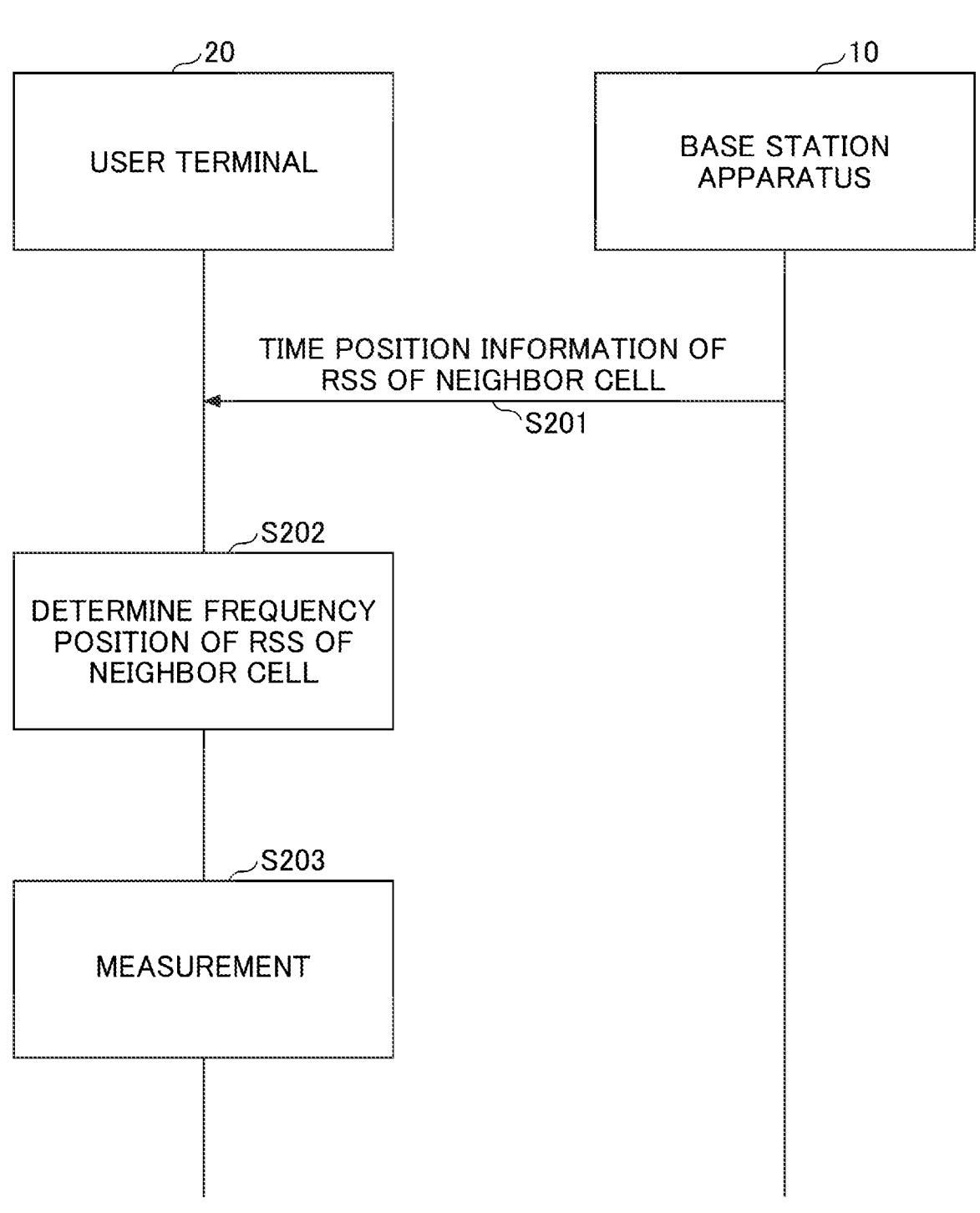
FIG. 11 is a diagram for explaining an operation example according to Example 1-2.

An example of an operation of Example 1-2 is shown in FIG. 11. As shown in FIG. 11, in S201, the base station apparatus 10 transmits information on a time position of an RSS of a neighbor cell to the user terminal 20. The transmission in S201 may be performed at the same time as transmission of configuration information of the RSS of the serving cell in S1 of FIG. 4, or it may be performed at a different time from S1 of FIG. 4. The above transmission may also be performed by any of RRC message, MAC CE, and DCI. The information on the RSS time position of the neighbor cell may include identification information (e.g., cell ID of a neighbor cell) that identifies the neighbor cell.

In S202, the user terminal 20 determines a frequency position of the RSS of the neighbor cell based on the information received at S201.

Figure 12:
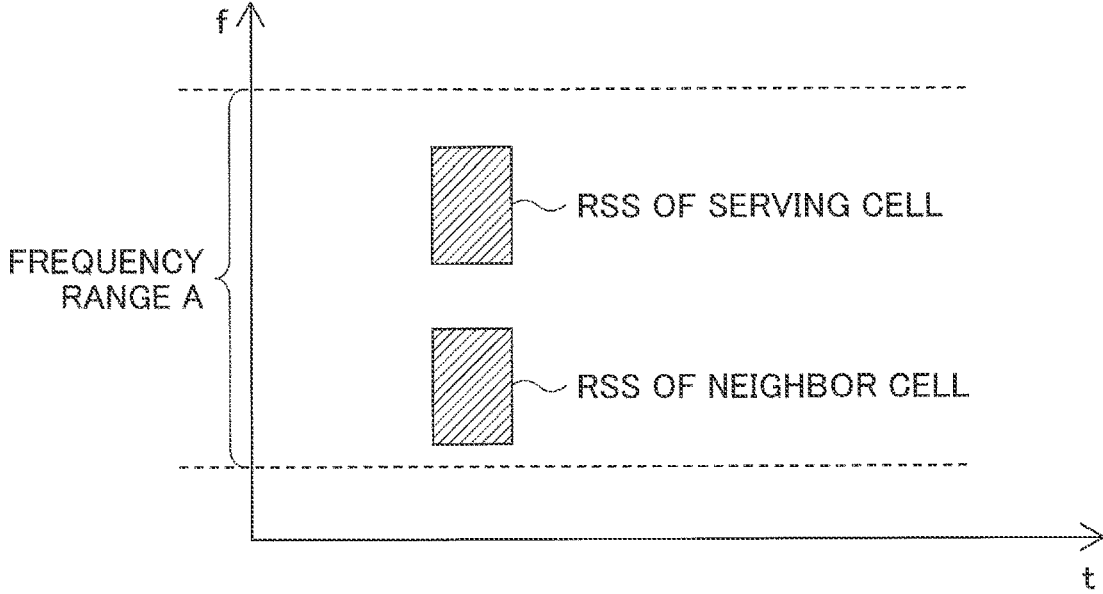
FIG. 12 is a diagram showing an example of arrangement of RSSs according to Example 1-2.

For example, if the information on the time position of the RSS of the neighbor cell is information indicating that the RSS of the serving cell and the RSS of the neighbor cell are at the same time position, the user terminal 20 determines that the frequency position of the RSS of the neighbor cell and the frequency position of the RSS of the serving cell are within a specific frequency range, for example, as shown in FIG. 12.

In S203, the user terminal 20 receives an RSS of the neighbor cell based on the determination in S202 and performs measurement. For example, in S201, if the information on the time position of the RSS of the neighbor cell is information indicating that the RSS of the serving cell and the RSS of the neighbor cell are at the same time position, the user terminal 20 receives the RSS of the neighbor cell and performs measurements at the time position of the RSS of the serving cell within a specific frequency range.

In the above example, when the user terminal 20 receives information on the time position, the user terminal assumes a frequency position, as an example. Similarly, for the time position, it may be determined that the time position of the RSS of the neighbor cell and the time position of the RSS of the serving cell are within a specified range.

Example 1-3 will now be described. Example 1-3 includes first and second examples.

First Example of Example 1-3

In the first example of Example 1-3, the base station apparatus 10 notifies (configures) the user terminal 20 of a frequency position of an RSS of the serving cell and a frequency position of an RSS of a neighbor cell as a relative position with respect to the frequency position for the serving cell. For the fact that the frequency position of the RSS of the neighbor cell can be specified by a relative position with respect to the frequency position of the RSS of the serving cell, it is assumed that the frequency position of the RSS of the neighbor cell is close to the frequency position of the RSS of the serving cell.

The above-described notification may be made along with configuration information transmission of the RSS of the serving cell in S1 of FIG. 4, or it may be made at a timing other than S1 of FIG. 4. In S1 of FIG. 4, when the notification is performed together with the configuration information transmission of the RSS of the serving cell, the information transmitted in S1 of FIG. 4 may be the information described in Example 1-3 instead of the information of the existing RSS-Config.

Such notification may also be made by an RRC message, MAC CE, or DCI. The notification may include identification information (e.g., cell ID of the neighbor cell) that identifies the neighbor cell.

When the base station apparatus 10 transmits, to the user terminal 20, a frequency position (denoted as F1) of an RSS of the serving cell and a relative position (denoted as $\Delta F$) therefrom, F1 and $\Delta F$ may be separate information (e.g., separate indexes), or F1 and $\Delta F$ may be jointly-coded.

If the information is separate, for example, F1 is notified as 34 (e.g., a position indicated by RB number) and $\Delta F$ is notified as 3 (meaning that it is separated by F1 by 3 RB). When joint-coding is performed, for example, notification is performed by one index (e.g., binary 11011). An index may, for example, be such that the high order 3 bits (e.g., 110) represent F1 and the low order 2 bits (e.g., 11) represent $\Delta F$. In other words, the frequency position can be specified at different resolution between the serving cell and the neighbor cell.

Figure 13:
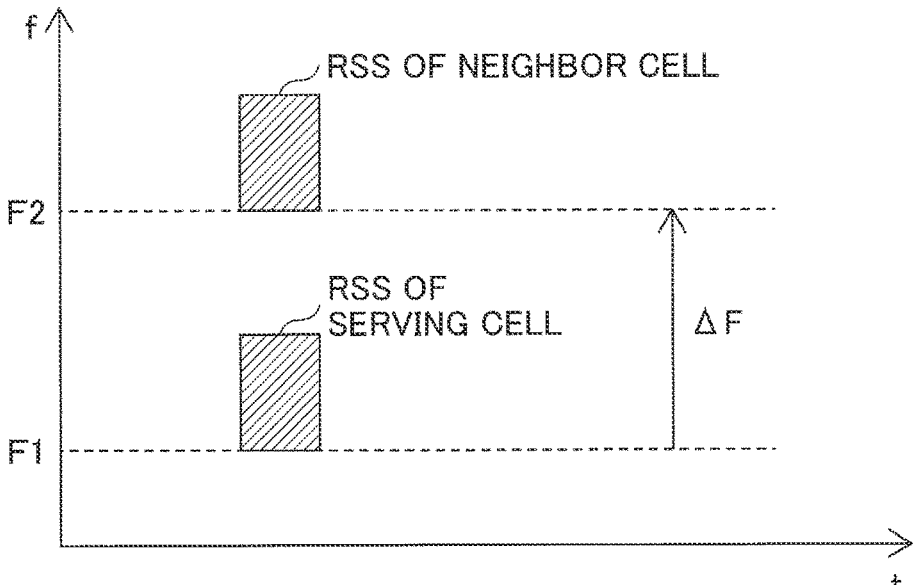
FIG. 13 is a diagram illustrating an image of a notification of arrangement of RSSs in Example 1-3.

The user terminal 20 receives the frequency position (F1) of the RSS of the serving cell and the relative position ($\Delta F$) therefrom to determine the frequency position of the RSS of the neighbor cell, for example, as shown in FIG. 13. In the example of FIG. 13, $F2=F1+\Delta F$ can be determined.

In Example 1-3, as in Example 1-1, operation may be changed depending on whether the serving cell and the neighbor cell are time-synchronized or not.

For example, when it is determined that the serving cell and the neighbor cell are time synchronized, the user terminal 20 expects to receive F1 and $\Delta F$ from the base station apparatus 10, receives F1 and $\Delta F$, determines the frequency position of the RSS of the neighbor cell, and performs measurement of the RSS of the neighbor cell.

When the user terminal 20 determines that the serving cell and the neighbor cell are not time-synchronized, the user terminal 20 assumes that F1 and $\Delta F$ are not received from the base station apparatus 10, and measures the RSS of the neighbor cell by utilizing detailed information of the time and frequency position of the neighbor cell received from the base station apparatus 10.

As to whether or not the serving cell and the neighbor cell are time-synchronized, if multiplexing mode of both the serving cell and the neighbor cell is TDD, it may be determined that the cells are time-synchronized, and if not, it may be determined that the cells are not time-synchronized.

The base station apparatus 10, for example, may transmit F1 and $\Delta F$ to the user terminal 20 when the base station apparatus 10 determines that the serving cell and the neighboring cell are time synchronized, and the base station apparatus 10 transmits absolute information of the frequency position of the neighbor cell when they are not time synchronized.

When the neighbor cell and the serving cell are time synchronized (for example, both cells are TDD), and the user terminal 20 determines that the time position of the RSS between the neighbor cell and the serving cell is the same (for example, when the information described in Example 1-2 is received), the user terminal 20 may receive, from the base station apparatus 10, F1 and $\Delta F$, and may determine the frequency position of the RSS of the neighbor cell using F1 and $\Delta F$.

If the neighbor cell and the serving cell are not time synchronized, or if the time position of the RSS is not the same between the neighbor cell and the serving cell, the user terminal 20 determines the frequency position of the RSS of the neighbor cell based on absolute information of the frequency position of the RSS of the neighbor cell received from the base station apparatus 10.

When the neighbor cell and the serving cell are time-synchronized (e.g., when both TDD), and the RSS time-position is the same between the neighbor cell and the serving cell, the base station apparatus 10 specifies the frequency position of the RSS of the neighbor cell as a relative position by transmitting F1 and $\Delta F$. Also, if the neighbor cell and the serving cell are not time synchronized, or if the RSS time positions are not the same between the neighbor cell and the serving cell, the base station apparatus 10 transmits absolute information of the frequency position of the RSS of the neighbor cell. However, such an operation of the base station apparatus 10 is an example.

The user terminal 20 may determine a frequency position (relative position) of an RSS of the neighbor cell based on a cell ID of the serving cell or a cell ID of the neighbor cell. For example, a remainder obtained by dividing a cell ID of a neighbor cell by N (where N is a predetermined integer) may represent the relative position of the neighbor cell's RSS relative to the frequency position of the RSS of the serving cell. When using the cell ID in this manner, explicit relative position notification described above is not required.

The user terminal 20 may also determine a frequency range in which a frequency position (relative position) of an RSS of the neighbor cell is present based on a cell ID of the serving cell or a cell ID of the neighbor cell. For example, a remainder obtained by dividing a cell ID of a neighbor cell by N (where N is a predetermined integer) may represent the frequency range of the relative position of the neighbor cell's RSS relative to the frequency position of the RSS of the serving cell.

The cell ID may be a PCI itself, a local ID, or a Group ID. Note that throughout this specification, the cell ID may be a PCI itself, a local ID, or a Group ID.

Second Example in Examples 1-3

Although the above example describes a frequency position of an RSS, the above example also applies to a time position of an RSS. Specifically, it is as follows. The first and second examples in Example 1-3 may be combined. The time position described below may be offset only or both of offset and period. The second example assumes that the serving cell and the neighbor cell are time-synchronized.

In the second example of Example 1-3, the base station apparatus 10 notifies (configures) the user terminal 20 of a time position of an RSS of the serving cell and a time position of an RSS of the neighbor cell as a relative position with respect to the time position of the RSS of the serving cell. For the fact that the time position of the RSS of the neighbor cell can be specified by a relative position with respect to the time position of the RSS of the serving cell, it is assumed that the time position of the RSS of the neighbor cell is close to the time position of the RSS of the serving cell. However, assumption is not limited to this.

The above-described notification may be made along with configuration information transmission of the RSS of the serving cell in S1 of FIG. 4, or it may be made at a timing other than S1 of FIG. 4. In S1 of FIG. 4, when the notification is performed together with the configuration information transmission of the RSS of the serving cell, the information transmitted in S1 of FIG. 4 may be the information described in Example 1-3 instead of the information of the existing RSS-Config.

Such notification may also be made by an RRC message, MAC CE, or DCI. The notification may include identification information (e.g., cell ID of the neighbor cell) that identifies the neighbor cell.

When the base station apparatus 10 transmits, to the user terminal 20, a time position (denoted as T1) of an RSS of the serving cell and a relative position (denoted as ΔT) therefrom, T1 and ΔT may be separate information (e.g., separate indexes), or T1 and ΔT may be jointly-coded.

Figure 14:
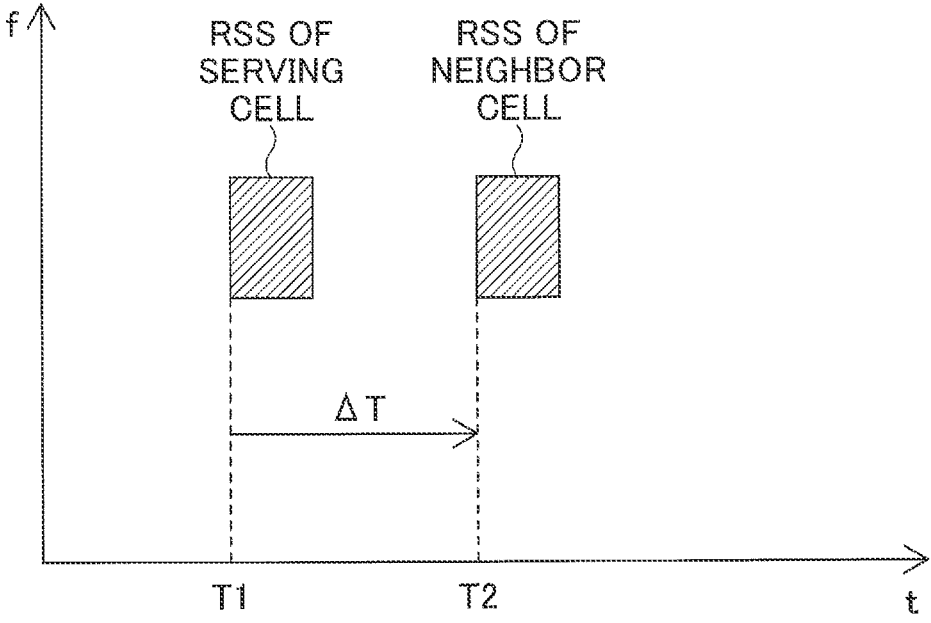
FIG. 14 is a diagram illustrating an image of a notification of arrangement of RSSs in Example 1-3.

The user terminal 20 receives the time position (T1) of the RSS of the serving cell and the relative position (ΔT) therefrom to determine the time position of the RSS of the neighbor cell, for example, as shown in FIG. 14 (the horizontal axis indicates offset). In the example of FIG. 14, $T2=T1+\Delta T$ can be determined.

The user terminal 20 may determine a time position (relative position) of an RSS of the neighbor cell based on a cell ID of the serving cell or a cell ID of the neighbor cell. For example, a remainder obtained by dividing a cell ID of a neighbor cell by N (where N is a predetermined integer) may represent the relative position of the neighbor cell's RSS relative to the time position of the RSS of the serving cell. When using the cell ID in this manner, explicit relative position notification described above is not required.

The user terminal 20 may also determine a time range (may be referred to as candidate range) in which a time position (relative position) of an RSS of the neighbor cell is present based on a cell ID of the serving cell or a cell ID of the neighbor cell. For example, a remainder obtained by dividing a cell ID of a neighbor cell by N (where N is a predetermined integer) may represent the time range of the relative position of the neighbor cell's RSS relative to the time position of the RSS of the serving cell.

The cell ID may be a PCI itself, a local ID, or a Group ID.

According to the Example 1 described above, the user terminal 20 can efficiently receive a resynchronization signal of neighbor cells.

EXAMPLE 2

Next, Example 2 will be described. In order for the user terminal 20 to perform a measurement using an RSS of a neighbor cell, information such as whether or not each neighbor cell is transmitting an RSS, and when transmitting the RSS, which time and frequency position is used for transmitting the RSS (this information is called assist information, which may be called support information) may be transmitted to the user terminal 20 from the base station apparatus 10. In this case, the user terminal 20 may perform measurement by the RSS of the neighbor cell using assist information. The information notified from the base station apparatus 10 to the user terminal 20 described in Example 1 is an example of assist information.

However, it is also contemplated that the base station apparatus 10 does not create a neighboring cell list and does not create time and frequency position information for each neighboring cell's RSS.

Figure 15:
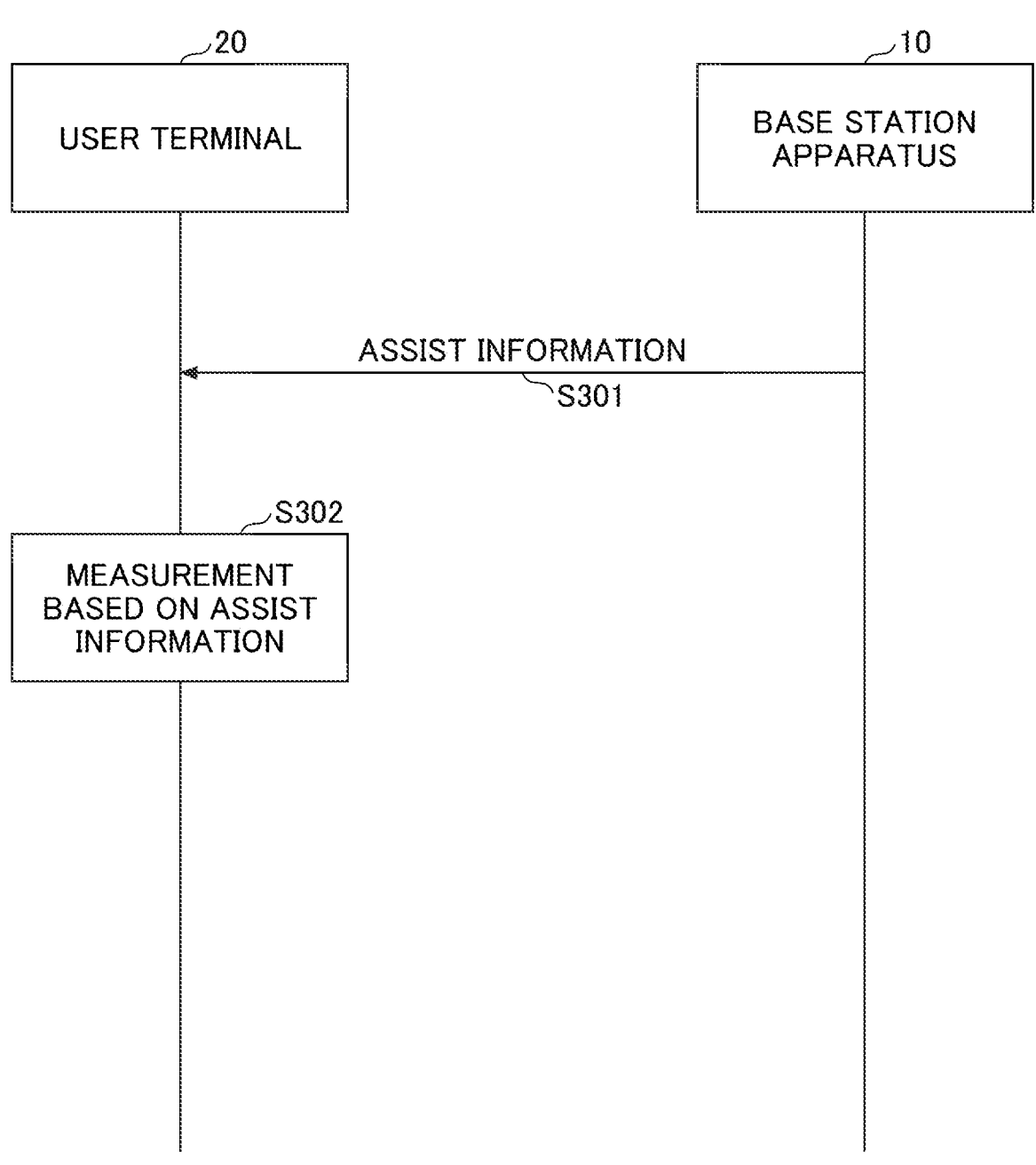
FIG. 15 is a diagram for explaining an operation example according to Example 2.

FIG. 15 is a diagram illustrating an operation example when assist information is used. In S301, the base station apparatus 10 transmits assist information to the user terminal 20. The assist information transmitted in S301 is information that supports RSS measurement of a neighbor cell for the user terminal 20 and includes, for example, a list of neighbor cells (e.g., a list of cell IDs of neighbor cells) and information on RSS measurement of each neighbor cell. Information on RSS measurement is, for example, information on a time and frequency position of an RSS.

The user terminal 20 that receives the assist information measures an RSS of a neighbor cell based on the assist information at S302. For example, for a neighbor cell, the user terminal 20 monitors a time and frequency position of an RSS of a neighbor cell indicated in the assist information to receive and measure the RSS of the neighbor cell.

In S1 of FIG. 4, the notification of the assist information may be performed together with the transmission of configuration information of an RSS of the serving cell or may be performed at a timing other than S1 of FIG. 4. Assist information may be notified by an RRC message, MAC CE, or DCI.

As an example, in the specification, notification of the above assist information is defined as an option in Higher layer signing, and operation may be switched for RSS measurement of a neighbor cell, depending on whether or not the notification is performed.

Figure 16:
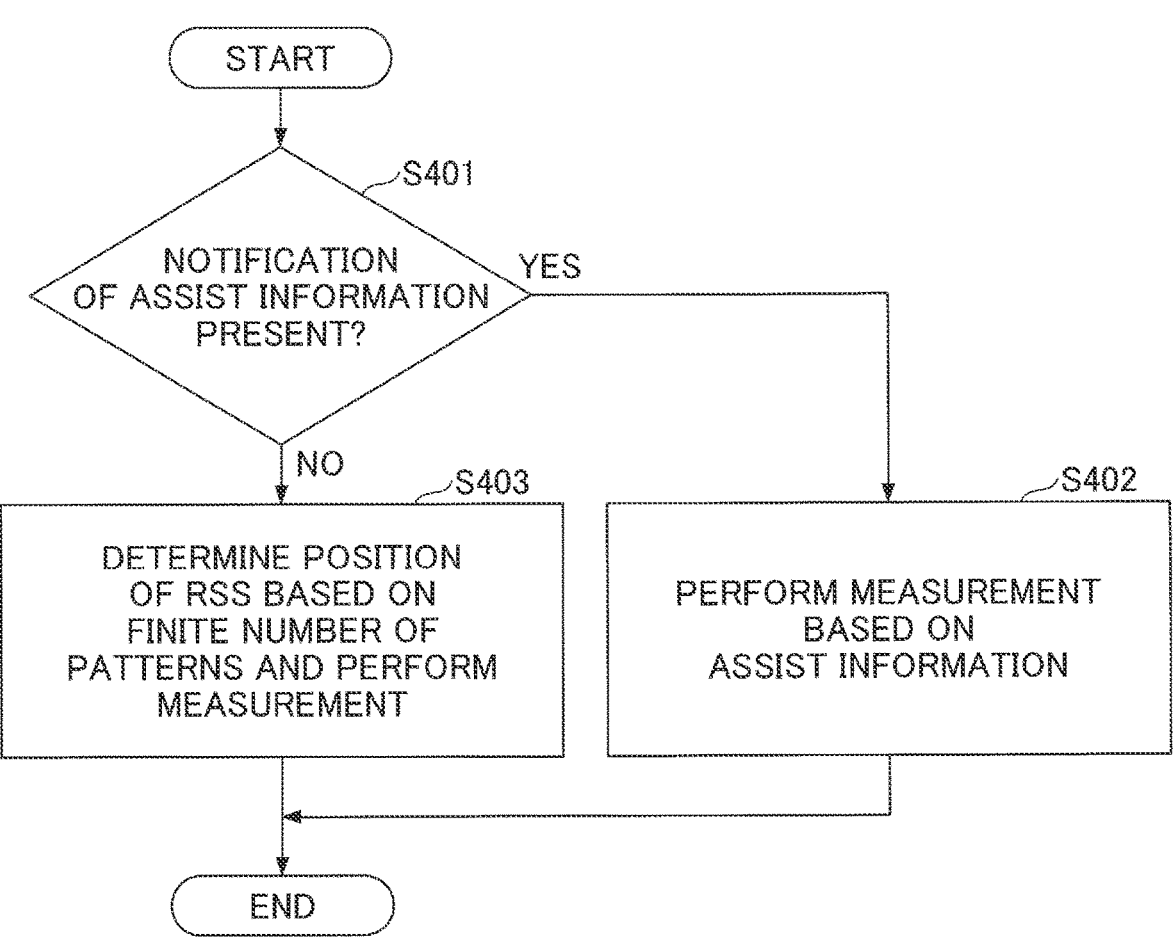
FIG. 16 is a diagram for explaining an operation example according to Example 2.

FIG. 16 is a diagram illustrating an example of the switching operation in the user terminal 20. In S401, the user terminal 20 determines whether or not assist information was received by upper layer signaling (e.g., system information) in the serving cell in which the user terminal 20 resides.

When the assist information is received (Yes of S401), in S402, the user terminal 20 performs measurement of an RSS of a neighbor cell based on the assist information.

When the assist information is not received (No in S401), in S403, the user terminal 20 determines a time and frequency position of an RSS based on, for example, a finite number of patterns and performs a measurement. The pattern may, for example, represents a plurality of candidates for time and frequency locations of the RSS, a range of time and frequency position of the RSS, and the user terminal 20 may, based on the pattern, blindly detect an RSS of the neighbor cell. One pattern may also be applied to a plurality of neighbor cells, or one pattern may be selected from a plurality of patterns depending on a cell ID of the neighbor cell.

The above-described pattern is specified, for example, as a pattern used only for RSS measurements of neighbor cells, and may be preconfigured in the user terminal 20 and the base station apparatus 10. The above pattern is, for example, a pattern that includes any one element of, any two elements of, or three elements of the following (1), (2), and (3).

(1) RSS frequency position;
(2) Transmission length and time offset of RSS or a position of a subframe at which an RSS can be placed;
(3) Frequency range at which an RSS of the serving cell and an RSS of the neighbor cell exist.

When the above-described (3) is used, it can be assumed that the RSS of the serving cell and the RSS of the neighbor cell are in a specific frequency range, and in this case, the user terminal 20 can determine that it is only necessary to monitor the frequency range around the frequency position of the known RSS of the serving cell.

Here, suppose that two patterns 1 and 2 are specified. As an example, Pattern 1 is "(frequency position A1, transmission length A1 and time offset A1), (frequency position A2, transmission length A2 and time offset A2), (frequency position A3, transmission length A3 and time offset A3)," and Pattern 2 is "(frequency position B1, transmission length B1 and time offset B1), (frequency position B2, transmission length B2 and time offset B2), (frequency position B3, transmission length B3 and time offset B3)."

For example, assuming that the user terminal 20 detects a cell ID of a neighbor cell from a PSS/SSS of the neighboring cell, the user terminal 20 determines that the pattern corresponding to the cell ID is pattern 1.

In this case, the user terminal 20 detects an RSS of the neighbor cell using the pattern 1 and performs measurement. That is, the user terminal 20 monitors the RSS of the neighbor cell in each of (a frequency position A1, a transmission length A1, and a time offset A1), (a frequency position A2, a transmission length A2, and a time offset A2), (a frequency position A3, a transmission length A3, and a time offset A3), receives and measures the RSS at a time and frequency position where the RSS of the neighbor cell is detected.

Alternatively, patterns may be associated with system bandwidths for selecting one pattern from a plurality of patterns.

For example, when Pattern 1=20 MHz and Pattern 2=10 MHz, if the user terminal 20 detects that bandwidth of the neighbor cell is 20 MHz based on system information and the like from the detected neighbor cell, the user terminal 20 monitors the RSS of the neighbor cell using Pattern 1.

In the above example, when assist information is provided, assist information is used. However, even when assist information is provided, the same method as described as an example when assist information is not provided may be used.

For example, the user terminal 20 and the base station apparatus 10 may assume that the base station apparatus 10 can place the RSS in a finite number of patterns, and the base station apparatus 10 may notify the user terminal 20 of information (an example of assist information) indicating at what time and frequency the RSS is actually transmitted in the pattern. The user terminal 20 identifies the pattern by the cell ID or the like of the neighbor cell and receives the RSS of the neighbor cell by the notification and the pattern. This reduces the signaling capacity because it is not necessary to determine from all candidate positions.

According to the Example 2 described above, even when the user terminal 20 does not receive support information to assist measurement of the resynchronization signal of the neighbor cell, the resynchronization signal of the neighbor cell can be measured.

EXAMPLE 3

Next, Example 3 will be described. As described above, in order for the user terminal 20 to perform measurement using an RSS of a neighboring cell, the base station apparatus 10 may transmit information (assist information) such as whether or not each neighbor cell transmits an RSS, and when transmitting, at what time and frequency position the RSS is transmitted to the user terminal 20.

When the assist information is transmitted, the user terminal needs to be notified of, for example, 7-bit time and frequency position for each neighbor cell.

It is necessary to reduce the above signaling overhead, and therefore it is considered to reduce candidates of position (time position or frequency position, or, time and frequency position) where RSS can be placed for RSS measurement.

As described before, it can be considered that "RSS time offset and RSS frequency position" where RSS is placed may be a function of a cell ID in order to reduce candidate positions where RSS can be positioned. However, if RSS time offset and frequency positions are determined based on cell IDs (=configurable in 99 different ways at the maximum), the time and frequency positions of RSS may collide between the serving cell and the neighbor cell, or between neighbor cells depending on combination of cell IDs between the serving cell and the neighbor cell or between neighbor cells. In other words, depending on the combination of cell IDs, RSS cannot be placed in orthogonal time and frequency resources. The details are as follows. Here, "orthogonal" means that the time and frequency positions are not overlapped.

As an example, if RSS is assumed to be orthogonal only in the frequency direction between cells, then frequency positions may collide between cells at frequency positions based on cell IDs (504 ways) because the number of frequency positions of RSS is 99 at the maximum (with a system bandwidth of 20 MHz). That is, different cell IDs may be associated with the same frequency position, and frequency positions may collide between cells if the placement is based on this relationship.

Assuming that RSS is orthogonalized in time and frequency direction between cells, for a maximum of 99 different frequency positions, time position of RSS is arranged in accordance with transmission period and transmission length of the RSS. In some cases, the time and frequency position of the RSS can be uniquely configured by associating the time and frequency position with the cell ID (RSS can be arranged in such a way that it is orthogonal between cells).

A first example in a case where the RSS can be arranged orthogonally and a second example in a case where the RSS cannot be arranged orthogonally are shown below.

First example: For an RSS period of 1280 ms, 32 time offsets can be applied with a time granularity size of 40 ms. In this case, by assuming 32 orthogonal placements in the time direction, 32×99 (larger than 504) placements are possible, and RSS at orthogonal time and frequency positions can be arranged for each cell ID.

Second example: For an RSS period of 160 ms, 16 time offsets can be applied with a time granularity size of 10 ms. For example, when the RSS transmission length is 40 ms, it is possible to assume 4 time placement patterns so that RSSs do not overlap each other by applying a time offset in units of 40 ms. However, since 4×99 is smaller than 504, the RSS may not be orthogonal between cells when cell ID represents "time offset and frequency position" and RSS is placed in each cell.

In addition to the above, if the user terminal 20 is limited in the range of frequencies that the user terminal 20 can monitor at the same time and an RSS is placed in that frequency range, it becomes more difficult to assume individual time and frequency resources for each cell ID.

In view of the above, in Example 3, signaling overhead is reduced by defining a candidate resource to be monitored by the user terminal 20 for neighbor cell detection by cell ID or the like. Hereinafter, Examples 3-1, 3-2, and 3-3 will be described.

Example 3-1

In Example 3-1, the user terminal 20 determines one or more time and frequency position candidates where RSS can be placed for RSS measurement of neighbor cells based on, for example, any one, any two, or three of the following information (1), (2), and (3). In view of the user terminal 20, the following information is about neighbor cells.

(1) Physical cell ID (called cell ID) or a part of the information (e.g., local ID);
(2) LTE system bandwidth;
(3) Period, and time offset of RSS.

Figure 17:
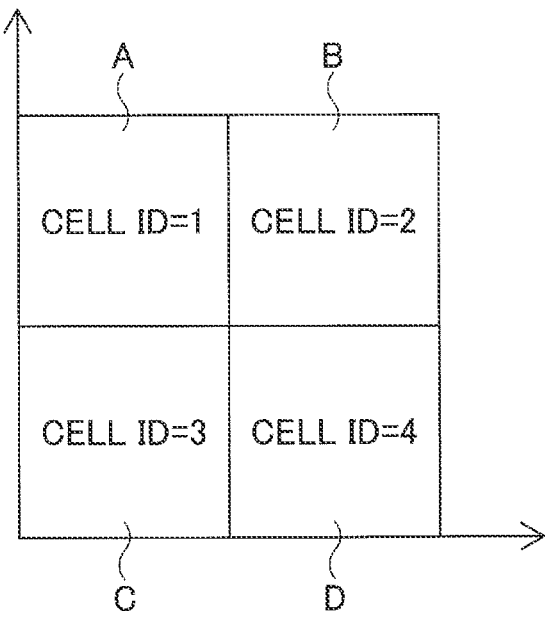
FIG. 17 is a diagram for explaining an operation example according to Example 3-1.

For example, as shown in FIG. 17, a time and frequency region represented by A is defined in the specification and the like as a candidate time and frequency position in which RSS transmitted from a neighbor cell with cell ID=1 is arranged, and a time and frequency region represented by B is defined in the specification and the like as a candidate time and frequency position in which RSS transmitted from a neighbor cell with cell ID=2 is arranged. The same applies to cell IDs=3 and 4. An RSS is sent at a resource location in each region.

The above-described description is from the viewpoint of the user terminal 20, and the base station apparatus of the neighbor cell transmits an RSS at a time and frequency position in the time and frequency region corresponding to the own cell ID.

In FIG. 17, the candidate is represented in the form of a region, but the candidate may be a plurality of time and frequency positions at which an RSS may be transmitted. For both of the case when the candidate is the time and frequency region and the case when the candidate is a plurality of time and frequency positions, this may be referred to as a "time and frequency candidate".

The time and frequency candidates (regions, positions, etc.) of an RSS of neighbor cells may overlap between neighbor cells. For example, in the example shown in FIG. 17, region A may be associated with three cells of cell ID=1, 10, and 20. It is only necessary that RSSs actually transmitted are not overlapped. The user terminal 20 can recognize whether a received RSS is an RSS of an expected cell by a cell ID that can be obtained from a sequence of the received RSS.

The above technique can reduce the signaling overhead. The base station apparatus 10 (or a base station apparatus of a neighbor cell) of the serving cell may notify the user terminal 20 of a time and frequency position at which the RSS is actually transmitted from among the time and frequency candidates (region, a plurality of positions, or the like) in a neighbor cell. Since this notification indicates a position (relative position) in the candidate, it is possible to notify the candidate in a smaller amount of information than that when the absolute position is notified.

This notification allows the user terminal 20 to receive and measure an RSS of a neighbor cell without blind detection. Examples of blind detection are described later in Example 3-2.

Defining a candidate as described above may be specified as default, and optional notification may be specified in the specification so that and operator can manually adjust the RSS position, and the above-mentioned candidate may be overwritten with the adjusted information. That is, when an RSS is transmitted from a time and frequency position other than the above-described candidate defined in association with the cell ID or the like in the neighbor cell, the base station apparatus 10 of the serving cell may notify the user terminal 20 that the RSS is transmitted from the neighbor cell at a time and frequency position other than the default candidate.

There are following first to third example as decision examples of time and frequency candidates of an RSS based on (1), (2), and (3) above for a neighbor cell by the user terminal 20.

First example: The user terminal 20 determines a time and frequency candidate (region, multiple positions, etc.) of an RSS corresponding to a cell ID of a neighboring cell. This determination is based, for example, on the specification, as noted above.

Second example: The user terminal 20 performs operation of first example only when the LTE system bandwidth of the neighbor cell is 20 MHz, which is the maximum. If the LTE system bandwidth of the neighbor cell is not the maximum 20 MHz, the user terminal 20 may perform measurement operation, for example, assuming that notification of Example 1 or notification of assist information of Example 2 is made.

Third example: The user terminal 20 may perform the operation of first only when the LTE system bandwidth of the neighbor cell is the maximum of 20 MHz, or when the period of RSS is 1280 ms and the transmission length is 8 ms. In neither case, for example, the measurement operation may be performed on the assumption that the notification of the Example 1 or the notification of the assist information of the Example 2 is made. The RSS period 1280 ms and the transmission length 8 ms in "the period of RSS is 1280 ms and the transmission length is 8 ms" are merely examples.

Example 3-2

In the Example 3-2, the user terminal 20 determines a time and frequency candidate (a region, a plurality of positions, etc.) of an RSS of a neighbor cell by the method described in the Example 3-1. In Example 3-2, the time and frequency position at which the RSS is actually transmitted among the candidates is not notified to the user terminal 20, and the user terminal 20 blindly detects the RSS of the corresponding neighbor cell from among the candidates. Whether or not received RSS is an RSS of the neighbor cell can be determined by a cell ID that can be obtained from the sequence of the RSS.

The base station apparatus 10 may individually notify the user terminal 20 of information on a position of an RSS of a neighbor cell only when the RSS is not placed at a candidate location of the neighbor cell, in which time and frequency candidates associated with cell IDs are specified by default. The information on the position may be a specific time and frequency position or information described in Example 1.

Figure 18:
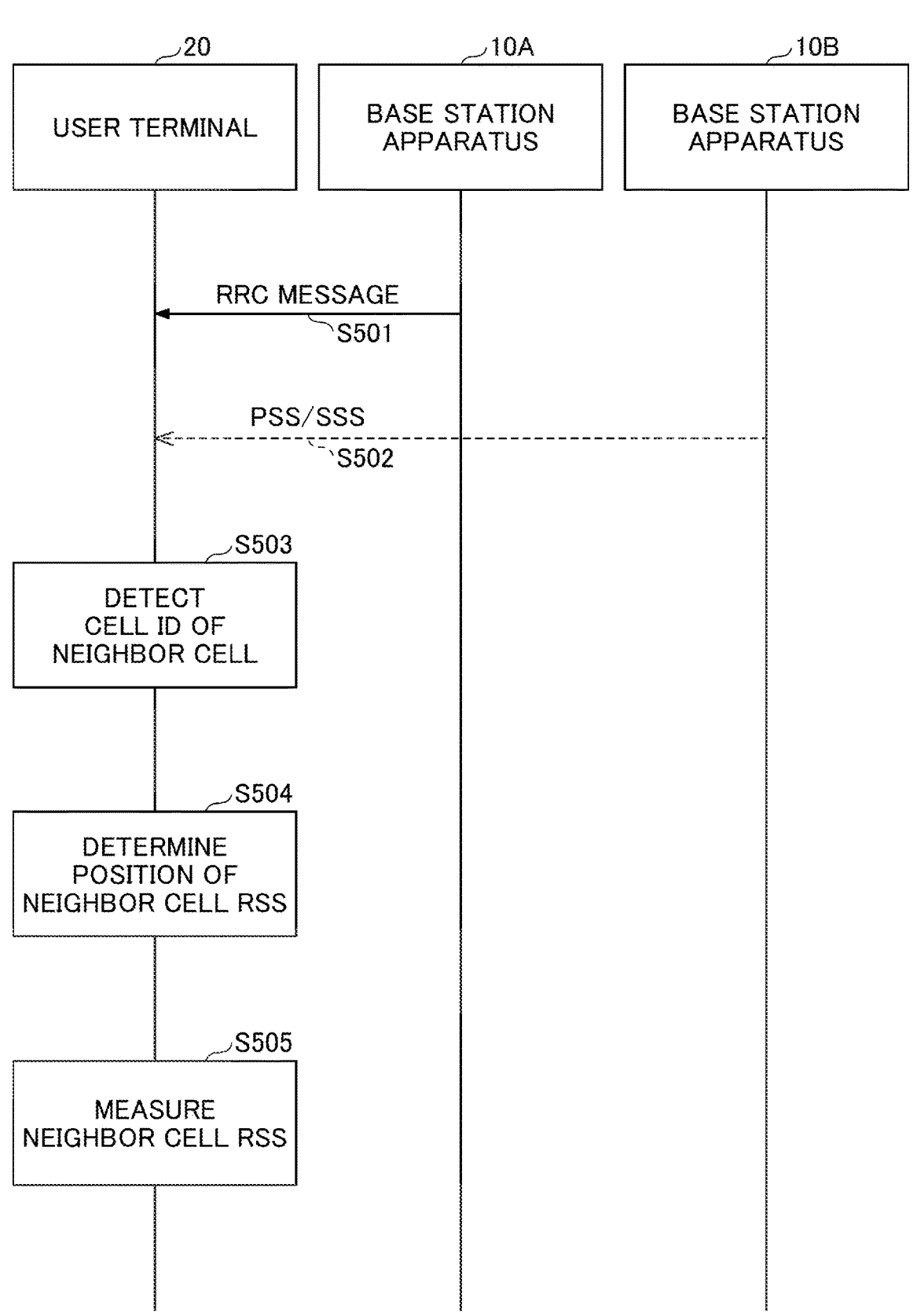
FIG. 18 is a diagram for explaining an operation example according to Example 3-2.

An operation example according to Example 3-2 will be described with reference to FIG. 18. FIG. 18 shows a base station apparatus 10A which provides the serving cell of the user terminal 20 and a base station apparatus 10B which provides a neighbor cell for the serving cell.

In S501, an RRC message is transmitted from the base station apparatus 10A to the user terminal 20. The RRC Message includes information on the time and frequency position of the RSS of the serving cell. This information allows measurement of the RSS of the serving cell in addition to measurement of the RSS of the neighbor cell as described below.

The user terminal 20 detects the cell ID of the neighbor cell at S503 by receiving PSS/SSS from the base station apparatus 10B of the neighbor cell in S502. The user terminal 20 ascertains the time and frequency candidate of the RSS corresponding to the cell ID.

In S504, the user terminal 20 detects the RSS of the neighbor cell by monitoring the above-described time and frequency candidate. In S505, the user terminal 20 measures the neighbor cells using the RSS.

Example 3-3

In any of Examples 1, 2, 3-1, and 3-2, in the RSS measurement, the user terminal 20 may be able to simultaneously capture RSSs of a plurality of neighbor cells.

Considering such a case, in Example 3-3, the number of RSSs detectable simultaneously by the user terminal 20 (which may be referred to as the number of cell IDs detected by the RSS) is specified in advance by the specification and the like, and the user terminal 20 performs RSS detection up to the number of RSSs. The number of RSS that the user terminal 20 can detect at the same time may be defined separately for RRC-IDLE state and for RRC-CONNECTED state.

Figure 19:
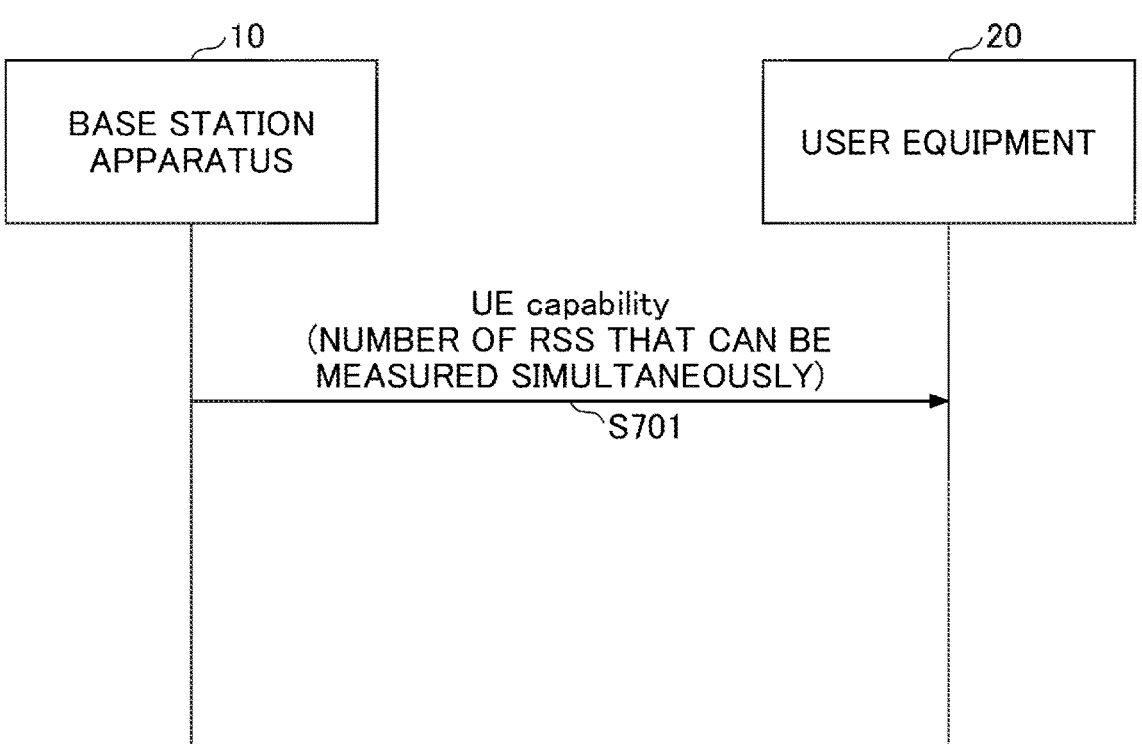
FIG. 19 is a diagram for explaining an operation example according to Example 3-3.

Alternatively (or additionally) to specify the number of RSSs detectable simultaneously by the user terminal 20 in advance by the specification or the like, as shown in S701 of FIG. 19, the user terminal 20 may notify the base station apparatus 10 of the number of RSSs detectable simultaneously as UE capacity.

According to the Example 3 described above, the user terminal 20 can reduce overhead of signaling performed for measurement of a resynchronization signal of a neighbor cell.

(Apparatus Configuration)

Next, a functional configuration example of the base station apparatus 10 and the user terminal 20 that perform the processing and operations described above will be described. The base station apparatus 10 and the user terminal 20 include functions for executing the above-described Examples 1 to 3. However, each of the base station apparatus 10 and the user terminal 20 may include only a part of the functions of Examples 1 to 3.

Base Station Apparatus 10

Figure 20:
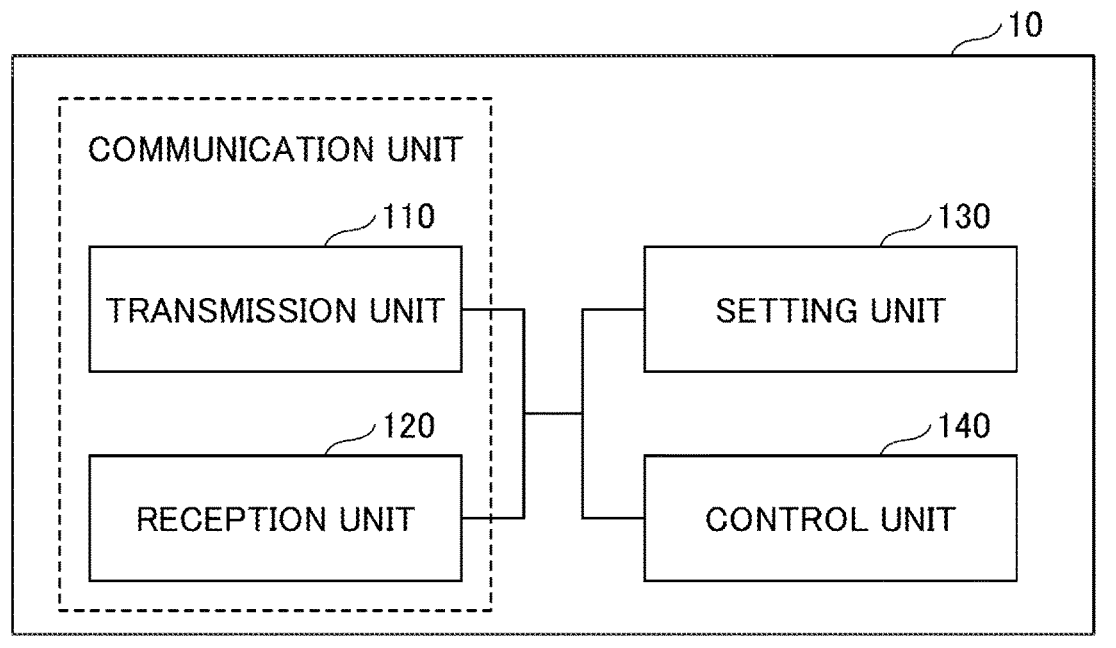
FIG. 20 is a diagram showing an example of a functional configuration of the base station apparatus 10 according to an embodiment of the present invention.

FIG. 20 is a diagram illustrating an example of a functional configuration of the base station apparatus 10. As shown in FIG. 20, the base station apparatus 10 includes a transmission unit 110, a reception unit 120, a setting unit 130, and a control unit 140. The functional configuration shown in FIG. 20 is only one example. If the operation according to the embodiments of the present invention can be performed, the functional category and the name of the functional unit may be any one. The transmission unit 110 and the reception unit 120 may be collectively referred to as a communication unit.

The transmission unit 110 includes a function for generating a signal to be transmitted to the user terminal 20 side and transmitting the signal wirelessly. The receiving unit 120 includes a function for receiving various signals transmitted from the user terminal 20 and acquiring, for example, information of a higher layer from the received signals. The transmission unit 110 has a function to transmit NR-PSS, NR-SSS, NR-PBCH, and DL/UL control signals, DCI by PDCCH, data by PDSCH, and the like to the user terminal 20.

The setting unit 130 stores preconfigured configuration information and various configuration information to be transmitted to the user terminal 20 in a storage device provided by the setting unit 130 and reads the preconfigured configuration information from the storage device as necessary.

The control unit 140 schedules DL reception or UL transmission of the user terminal 20 through the transmission unit 110. A function unit related to signal transmission in the control unit 140 may be included in the transmission unit 110, and a function unit related to signal reception in the control unit 140 may be included in the receiving unit 120. The transmission unit 110 may be called a transmitter, and the reception unit 120 may be called a receiver.

User Terminal 20

Figure 21:
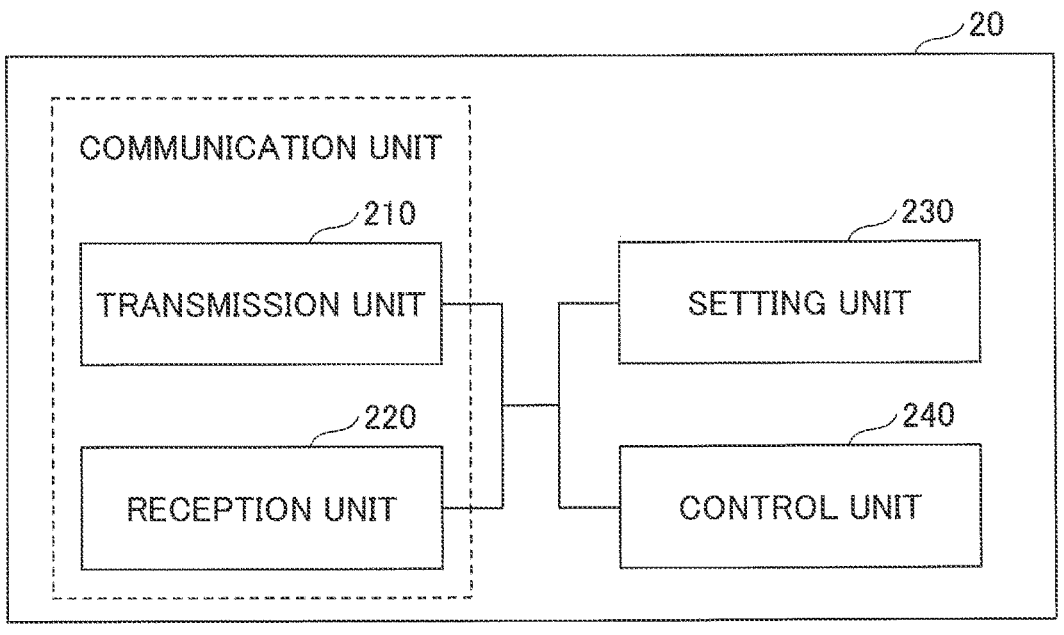
FIG. 21 is a diagram showing an example of a functional configuration of the user terminal 20 according to an embodiment of the present invention.
Figure 22:
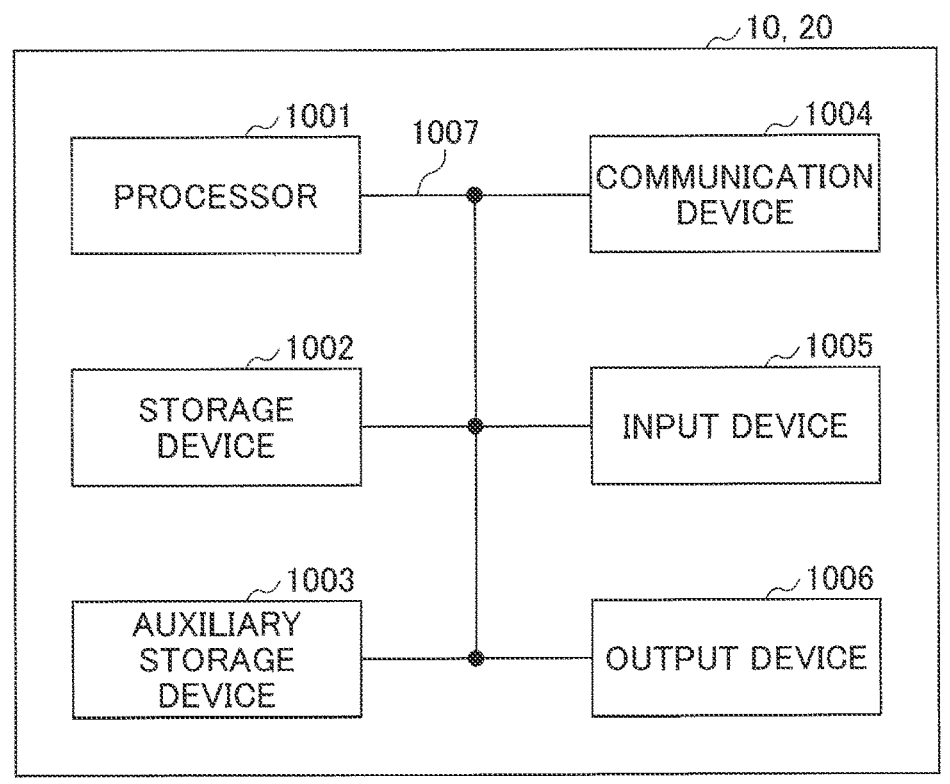
FIG. 22 is a diagram illustrating an example of the hardware configuration of the base station apparatus 10 or the user terminal 20 according to an embodiment of the present invention.

FIG. 21 is a diagram illustrating an example of the functional configuration of the user terminal 20. As shown in FIG. 21, the user terminal 20 includes a transmission unit 210, a reception unit 220, a setting unit 230, and a control unit 240. The functional configuration shown in FIG. 21 is only one example. If the operation according to the embodiments of the present invention can be performed, the functional category and the name of the functional unit may be any one. The transmission unit 210 and the reception unit 220 may be collectively referred to as a communication unit. The user terminal 20 may be referred to as a terminal.

The transmission unit 210 creates a transmission signal from the transmission data and wirelessly transmits the transmission signal. The receiving unit 220 receives various signals wirelessly and acquires signals from higher layers from the received signal of the physical layer. The receiving unit 220 has a function to receive NR-PSS, NR-SSS, NR-PBCH, and DL/UL/SL control signals transmitted from the base station apparatus 10, DCI by PDCCH, data by PDSCH, and the like. For example, the transmitting unit 210 may transmit PSCCH (Physical Sidelink Control Channel), PSSCH (Physical Sidelink Shared Channel), PSDCH (Physical Sidelink Discovery Channel), PSBCH (Physical Sidelink Broadcast Channel), etc. to another user terminal 20 as D2D communication, and the receiving unit 120 may receive PSCCH, PSSCCH, PSDCH, PSDCH, or PSBCH, etc. from another user terminal 20.

The setting unit 230 stores various configuration information received from the base station apparatus 10 or the user terminal 20 by the receiving unit 220 in the storage device provided by the setting unit 230 and reads it from the storage device as necessary. The setting unit 230 also stores the preconfigured configuration information.

The control unit 240 performs control of the user terminal 20. A function unit related to signal transmission in the control unit 240 may be included in the transmission unit 210, and a function unit related to signal reception in the control unit 240 may be included in the receiving unit 220. The transmission unit 210 may be referred to as a transmitter, and the reception unit 220 may be referred to as a receiver.

Summary

According to the present embodiment, at least a terminal and the like described in each of items 1-3 are provided.

Appendix 1

(Item 1)

A terminal comprising:

a reception unit 220 configured to receive, from a base station apparatus of a serving cell, information indicating a relation between a frequency position of a resynchronization signal of the serving cell and a frequency position of a resynchronization signal of a neighbor cell, wherein the reception unit receives the resynchronization signal of the neighbor cell at a frequency position based on the relation.

(Item 2)

A terminal comprising:

a control unit 240 configured to determine whether a serving cell and a neighbor cell are time-synchronized; and a reception unit 200 configured, when the control unit determines that the serving cell and the neighbor cell are time-synchronized, to receive a resynchronization signal of the neighbor cell by assuming that a frequency position of a resynchronization signal of the serving cell and a frequency position of a resynchronization signal of the neighbor cell have a specific relation (Item 3)

A terminal comprising:

a reception unit 220 configured to receive information on a time position of a resynchronization signal of a neighbor cell from a base station apparatus of a serving cell, wherein the reception unit receives the resynchronization signal of the neighbor cell by assuming that a frequency position or a time position of a resynchronization signal of the serving cell and a frequency position or a time position of a resynchronization signal of the neighbor cell have a specific relation.

(Item 4)

A terminal comprising:

a reception unit 220 configured to receive, from a base station apparatus of a serving cell, a first position that is a position of a resynchronization signal of the serving cell and a second position that is a relative position from the first position as a position of a resynchronization signal of a neighbor cell, wherein the reception unit receives the resynchronization signal of the neighbor cell based on the first position and the second position.

(Item 5)

The terminal as claimed in claim 4, wherein the reception unit receives the first position and the second position as one jointly-coded value.

(Item 6)

A base station apparatus comprising:

a transmission unit 110 configured to transmit, to a terminal, information indicating a relation between a frequency position of a resynchronization signal of a serving cell and a frequency position of a resynchronization signal of a neighbor cell, wherein the terminal receives the resynchronization signal of the neighbor cell at a frequency position based on the relationship.

According to any of the configurations described in items 1 to 6, the user terminal can efficiently receive a resynchronization signal of a neighbor cell.

Appendix 2

(Item 1)

A terminal comprising:

a control unit 240 configured, when support information for supporting measurement by a resynchronization signal of a neighbor cell is not received, to determine a pattern of a position of a resource where the resynchronization signal of the neighbor cell can be transmitted based on information of the neighbor cell; and a reception unit 220 configured to receive the resynchronization signal of the neighbor cell based on the pattern.

(Item 2)

The terminal as claimed in claim 1, wherein, when the support information is received, the reception unit receives the resynchronization signal of the neighbor cell using the support information, or determines a pattern of a position of a resource where the resynchronization signal of the neighbor cell can be received using information of the neighbor cell, and receives the resynchronization signal of the neighbor cell using the pattern.

(Item 3)

The terminal as described in item 1 or item 2, wherein the information of the neighbor cell is a cell ID or a system bandwidth.

(Item 4)

The terminal as described in any items of item 1 to item 3, wherein the pattern includes a frequency position candidate, a time position candidate, or a frequency range, of the resynchronization signal of the neighbor cell.

(Item 5)

A reception method executed by a terminal comprising:

when support information for supporting measurement by a resynchronization signal of a neighbor cell is not received, determining a pattern of a position of a resource where the resynchronization signal of the neighbor cell can be transmitted based on information of the neighbor cell; and receiving the resynchronization signal of the neighbor cell based on the pattern.

According to any of the configurations described in items 1 to 5, the user terminal can receive a resynchronization signal of a neighbor cell even when the user terminal does not receive support information supporting measurement of the resynchronization signal of the neighbor cell.

Appendix 3

(Item 1)

A terminal comprising:

a control unit 240 configured to determine a candidate of a position of a resource where a resynchronization signal of a neighbor cell can be received based on information of the neighbor cell; and a reception unit 220 configured to receive the resynchronization signal of the neighbor cell based on the candidate.

(Item 2)

The terminal as claimed in claim 1, wherein the reception unit receives the resynchronization signal of the neighbor cell based on the candidate and information indicating a position of a resource by which the resynchronization signal of the neighbor cell is actually transmitted.

(Item 3)

The terminal as described in item 1, wherein the reception unit performs blind detection of the resynchronization signal of the neighbor cell based on the candidate.

(Item 4)

The terminal as described in any items of item 1 to item 3, wherein the information of the neighbor cell includes a cell ID, a system bandwidth, or information on a time position of a resynchronization signal.

(Item 5)

The terminal as described in any items of item 1 to item 4, further comprising a transmission unit 210 configured to transmit, to a base station apparatus, a number of resynchronization signals that can be simultaneously received as capability information.

According to any of the configurations described in items 1 to 5, overhead of signaling performed by the user terminal for measuring a resynchronization signal of a neighbor cell can be reduced.

Hardware Configuration

The block diagrams (FIGS. 20 and 21) used for explaining the above embodiment illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmitting unit or a transmitter. As described above, a method for implementing these functions is not particularly limited.

For example, the base station apparatus 10, the user terminal 20, and the like according to one embodiment of the present disclosure may function as a computer that performs processing of a wireless communication according to the present disclosure. FIG. 16 is a drawing illustrating an example of a hardware configuration of the base station apparatus 10 or the user terminal 20 according to an embodiment of the present disclosure. Each of the base station apparatus 10 and user terminal 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station apparatus 10 and the user terminal 20 may be configured to include one or more of the devices illustrated in drawings, or may be configured not to include some of the devices.

Each function of the base station apparatus 10 and the user terminal 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be realized by the processor 1001.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the base station apparatus 10, as illustrated in FIG. 20, may be implemented by a control program that is stored in the storage device 1002 and that is executed by the processor 1001. Also, for example, the control unit 240 of the user terminal 20, as illustrated in FIG. 21, may be implemented by a control program that is stored in the storage device 1002 and that is executed by the processor 1001. Explanation has been provided above for the case in which the above various processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The auxiliary storage device 1003 may be referred to as an auxiliary storage device. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station apparatus 10 and the user terminal 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

Supplements to Embodiment

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 10 and the user terminal 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user terminal 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user terminal 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. But the another network node may be a combination of a plurality of other network nodes (for example, a MME and a S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUSCH, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

In addition, a base station apparatus according to the present disclosure may be read as a user terminal. For example, each aspect or embodiment of the present disclosure may be applied to a configuration in which communication between a base station apparatus and a user terminal is replaced by communication between a plurality of user terminals 20 (that may be called D2D (Device-to-Device), V2X (Vehicle-to-Everything), or the like). In this case, a user terminal 20 may have above-described functions of the base station apparatus 10. In this regard, a word such as "up" or "down" may be read as a word corresponding to communication between terminals (for example, "side"). For example, an uplink channel, a downlink channel, or the like may be read as a side channel.

Similarly, a user terminal according to the present disclosure may be replaced with a base station apparatus. In this case, a base station apparatus may have above-described functions of the user terminal.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like. Also, one slot may be referred to as a unit time. The unit time may vary from cell to cell depending on the numerology.

A TTI means, for example, a minimum time unit of scheduling in radio communication. For example, in an LTE system, a base station performs scheduling for each user terminal 20 to assign, in TTI units, radio resources (such as frequency bandwidths, transmission power, and the like that can be used by each user terminal 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel. 8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, the transmission unit 210 and the reception unit 220 are examples of communication units. The transmission unit 110 and the reception unit 120 are examples of communication units. UECpability Enquiry is an example of a first RRC message that queries the capabilities of a user terminal. UECpability Information is an example of a second RRC message reporting UE capabilities.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

DESCRIPTION OF SYMBOLS

10 base station apparatus
110 transmitting unit
120 receiving unit
130 setting unit
140 control unit
20 user terminal
210 transmitting unit
220 receiving unit
230 setting unit
240 control unit
1001 processor
1002 storage device
1003 auxiliary storage device
1004 communication device
1005 input device
1006 output device

The invention claimed is:

1. A terminal comprising:
a controller configured to determine a frequency position and a time position of a first resynchronization signal for a serving cell and a second resynchronization signal for a neighbor cell by using a cell ID; and
a receiver configured to receive the first resynchronization signal for the serving cell and the second resynchronization signal for the neighbor cell by using the frequency position and the time position,
wherein the terminal receives a granularity of a time offset of the first resynchronization signal that is determined based upon a transmission periodicity of the first resynchronization signal,
wherein the controller determines the frequency position and the time position based on a remainder of dividing the cell ID by a predetermined integer, wherein the terminal is configured to perform a measurement using the first resynchronization signal for the serving cell and the second resynchronization signal for the neighbor cell, and wherein the controller is configured to determine a same time offset for the first resynchronization signal and for the second resynchronization signal in a case where the frequency position of the first resynchronization signal and the second resynchronization signal are different.

2. A base station comprising:

a controller configured to determine a frequency position and a time position of a first resynchronization signal for a serving cell and a second resynchronization signal for a neighbor cell by using a cell ID; and a transmitter configured to transmit the first resynchronization signal for the serving cell and the second resynchronization signal for the neighbor cell by using the frequency position and the time position, wherein the base station is configured to transmit a granularity of a time offset of the first resynchronization signal that is determined based upon a transmission periodicity of the first resynchronization signal, wherein the controller determines the frequency position and the time position based on a remainder of dividing the cell ID by a predetermined integer, wherein a terminal is configured to perform a measurement using the first resynchronization signal for the serving cell and the second resynchronization signal for the neighbor cell, and wherein the terminal is configured to determine a same time offset for the first resynchronization signal and for the second resynchronization signal in a case where the frequency position of the first resynchronization signal and the second resynchronization signal are different.

3. A communication system comprising:

a base station comprising:

a controller configured to determine a frequency position and a time position of a first resynchronization signal for a serving cell and a second resynchronization signal for a neighbor cell by using a cell ID; and a transmitter configured to transmit the first resynchronization signal for the serving cell and the second resynchronization signal for the neighbor cell by using the frequency position and the time position, and a terminal comprising:

a controller configured to determine the frequency position and the time position of the first resynchronization signal for the serving cell and the second resynchronization signal for the neighbor cell by using the cell ID; and a receiver configured to receive the first resynchronization signal for the serving cell and the second resynchronization signal for the neighbor cell by using the frequency position and the time position, wherein the terminal receives a granularity of a time offset of the first resynchronization signal that is determined based upon a transmission periodicity of the first resynchronization signal, wherein the controller determines the frequency position and the time position based on a remainder of dividing the cell ID by a predetermined integer, wherein the terminal is configured to perform a measurement using the first resynchronization signal for the serving cell and the second resynchronization signal for the neighbor cell, and wherein the controller is configured to determine a same time offset for the first resynchronization signal and for the second resynchronization signal in a case where the frequency position of the first resynchronization signal and the second resynchronization signal are different.

4. A communication method executed by a terminal, comprising:

determining a frequency position and a time position of a first resynchronization signal for a serving cell and a second resynchronization signal for a neighbor cell by using a cell ID, wherein the frequency position and the time position are determined based on a remainder of dividing the cell ID by a predetermined integer;

receiving the first resynchronization signal for the serving cell and the second resynchronization signal for the neighbor cell by using the frequency position and the time position;

receiving a granularity of a time offset of the first resynchronization signal that is determined based upon a transmission periodicity of the first resynchronization signal;

performing a measurement using the first resynchronization signal for the serving cell and the second resynchronization signal for the neighbor cell; and determining a same time offset for the first resynchronization signal and for the second resynchronization signal in a case where the frequency position of the first resynchronization signal and the second resynchronization signal are different.

* * * * *